(12) United States Patent
Capers et al.

(10) Patent No.: US 11,861,579 B1
(45) Date of Patent: Jan. 2, 2024

(54) INTELLIGENT INVENTORY SYSTEM

(71) Applicant: Block, Inc., San Francisco, CA (US)

(72) Inventors: Matthew Capers, South San Francisco, CA (US); Brian Stegall, San Francisco, CA (US); Katherine Brennan, Oakland, CA (US); Marsal Gavalda, Sandy Springs, GA (US); Matthew O'Connor, New York, NY (US)

(73) Assignee: Block, Inc., San Francisco, CA (US)

( * ) Notice: Subject to any disclaimer, the term of this patent is extended or adjusted under 35 U.S.C. 154(b) by 8 days.

(21) Appl. No.: 16/051,257

(22) Filed: Jul. 31, 2018

(51) Int. Cl.
*G06Q 20/20* (2012.01)
*G06Q 10/087* (2023.01)

(52) U.S. Cl.
CPC ......... *G06Q 20/203* (2013.01); *G06Q 10/087* (2013.01)

(58) Field of Classification Search
CPC .................................................. G06Q 20/203
See application file for complete search history.

(56) References Cited

U.S. PATENT DOCUMENTS

| | | | |
|---|---|---|---|
| 5,057,829 A | 10/1991 | Velazquez | |
| 5,168,445 A * | 12/1992 | Kawashima | ......... G06Q 10/087 700/90 |
| 5,765,143 A | 6/1998 | Sheldon et al. | |
| 5,933,813 A | 8/1999 | Teicher et al. | |
| 6,035,284 A | 3/2000 | Straub et al. | |
| 6,151,582 A | 11/2000 | Huang et al. | |
| 6,298,331 B1 * | 10/2001 | Walker | ................... G06Q 20/12 705/15 |
| 6,431,444 B1 | 8/2002 | Gatto | |
| 6,595,342 B1 | 7/2003 | Maritzen et al. | |
| 6,609,101 B1 | 8/2003 | Landvater | |
| 6,687,679 B1 | 2/2004 | Van Luchene et al. | |

(Continued)

FOREIGN PATENT DOCUMENTS

| | | |
|---|---|---|
| CA | 2 332 083 A1 | 7/2001 |
| WO | 2013/026167 A1 | 2/2013 |

OTHER PUBLICATIONS

Deng, Shangkun et al. (Mar. 25, 2014). Stock Price Change Rate Prediction by Utilizing Social Network Activities, Hindawi Publishing Corp. (hereinafter "NPL1").*

(Continued)

*Primary Examiner* — Peter Ludwig
(74) *Attorney, Agent, or Firm* — Lee & Hayes, P.C.

(57) ABSTRACT

Systems and methods for an intelligent inventory system are disclosed. The systems and methods described herein may receive data from a point-of-sale (POS) device of a merchant indicating an item to add to an inventory catalog of the merchant. A rate may be determined that is associated with how many times the item may be returned or exchanged with a similarly-situated merchant. Additionally, or alternatively, the rate may comprise a fluctuation in price for the item and/or an amount of times the item may be re-stocked and/or re-ordered by the similarly-situated merchant. If the determined rate exceeds a threshold rate, a suggestion may be sent to the POS device of the merchant. The suggestion may comprise a suggested second item rather than the item requested, a suggested price to charge for the item suggested, and/or a suggested quantity to order of the item requested.

18 Claims, 8 Drawing Sheets

(56) References Cited

U.S. PATENT DOCUMENTS

| | | | |
|---|---|---|---|
| 7,013,290 B2* | 3/2006 | Ananian | G06Q 30/02 |
| | | | 705/26.42 |
| 7,092,929 B1 | 8/2006 | Dvorak et al. | |
| 7,222,786 B2 | 5/2007 | Renz et al. | |
| 7,343,319 B1 | 3/2008 | Walker et al. | |
| 7,552,066 B1 | 6/2009 | Landvater | |
| 7,589,628 B1* | 9/2009 | Brady, Jr. | H04L 67/306 |
| | | | 340/8.1 |
| 7,660,738 B1 | 2/2010 | Siegel et al. | |
| 7,720,708 B1 | 5/2010 | Elkins, II et al. | |
| 7,792,256 B1 | 9/2010 | Arledge et al. | |
| 7,818,284 B1 | 10/2010 | Walker et al. | |
| 7,882,209 B1 | 2/2011 | Eslambolchi et al. | |
| 7,941,331 B2 | 5/2011 | Dogan et al. | |
| 7,979,299 B1 | 7/2011 | Mehta et al. | |
| 8,001,017 B1 | 8/2011 | Franco | |
| 8,103,538 B2 | 1/2012 | Bamberg et al. | |
| 8,204,799 B1 | 6/2012 | Murray et al. | |
| 8,239,296 B2 | 8/2012 | Itoi et al. | |
| 8,355,954 B1 | 1/2013 | Goldberg et al. | |
| 8,417,572 B1 | 4/2013 | Chenault | |
| 8,438,066 B1 | 5/2013 | Yuen et al. | |
| 8,533,053 B2 | 9/2013 | Brown et al. | |
| 8,650,062 B2* | 2/2014 | Krech | G06Q 10/087 |
| | | | 705/7.26 |
| 8,725,594 B1 | 5/2014 | Davies et al. | |
| 8,732,040 B1 | 5/2014 | Prabhune et al. | |
| 9,152,724 B1* | 10/2015 | Eitreim | G06Q 30/0603 |
| 9,168,315 B1 | 10/2015 | Scaringe et al. | |
| 9,323,441 B1 | 4/2016 | Minks-Brown et al. | |
| 9,619,483 B1 | 4/2017 | Robinson et al. | |
| 9,619,831 B1* | 4/2017 | Kumar | G06Q 30/0631 |
| 9,659,310 B1* | 5/2017 | Allen | G06Q 30/0254 |
| 9,786,005 B1 | 10/2017 | Poursartip et al. | |
| 9,792,597 B1* | 10/2017 | Jen | G06Q 10/087 |
| 10,140,623 B1 | 11/2018 | Lloyd et al. | |
| 10,318,569 B1 | 6/2019 | Funk et al. | |
| 10,339,548 B1 | 7/2019 | Kumar et al. | |
| 10,373,118 B1* | 8/2019 | Lefkow | G06Q 10/0838 |
| 10,467,583 B1 | 11/2019 | Jen et al. | |
| 10,878,394 B1 | 12/2020 | Gjertson et al. | |
| 11,481,749 B1 | 10/2022 | Gjertson et al. | |
| 2001/0034722 A1 | 10/2001 | Tidball et al. | |
| 2001/0042008 A1 | 11/2001 | Hull et al. | |
| 2002/0010661 A1 | 1/2002 | Waddington et al. | |
| 2002/0065839 A1 | 5/2002 | McCulloch | |
| 2002/0072988 A1 | 6/2002 | Aram | |
| 2002/0091595 A1 | 7/2002 | Itoi et al. | |
| 2002/0133368 A1 | 9/2002 | Strutt et al. | |
| 2002/0147656 A1 | 10/2002 | Tam et al. | |
| 2002/0174000 A1 | 11/2002 | Katz et al. | |
| 2002/0188579 A1 | 12/2002 | Liu et al. | |
| 2003/0006098 A1 | 1/2003 | Wike, Jr. et al. | |
| 2003/0018701 A1 | 1/2003 | Kaestle et al. | |
| 2003/0026404 A1 | 2/2003 | Joyce et al. | |
| 2003/0033179 A1 | 2/2003 | Katz et al. | |
| 2003/0046133 A1 | 3/2003 | Morley et al. | |
| 2003/0151821 A1 | 8/2003 | Favalora et al. | |
| 2003/0216969 A1 | 11/2003 | Bauer et al. | |
| 2004/0019552 A1 | 1/2004 | Tobin | |
| 2004/0039639 A1 | 2/2004 | Walker et al. | |
| 2004/0098311 A1 | 5/2004 | Nair et al. | |
| 2004/0153359 A1 | 8/2004 | Ho et al. | |
| 2004/0181753 A1 | 9/2004 | Michaelides | |
| 2004/0186783 A1 | 9/2004 | Knight et al. | |
| 2004/0215539 A1* | 10/2004 | Doi | G06Q 40/04 |
| | | | 705/35 |
| 2004/0267640 A1 | 12/2004 | Bong et al. | |
| 2005/0149414 A1 | 7/2005 | Schrodt et al. | |
| 2005/0246245 A1 | 11/2005 | Satchell et al. | |
| 2005/0250555 A1 | 11/2005 | Richardson et al. | |
| 2005/0273377 A1 | 12/2005 | Ouimet et al. | |
| 2005/0283404 A1 | 12/2005 | Young | |
| 2006/0031085 A1 | 2/2006 | Postel et al. | |
| 2006/0106699 A1 | 5/2006 | Hitalenko et al. | |
| 2006/0149639 A1 | 7/2006 | Liu et al. | |
| 2006/0195563 A1 | 8/2006 | Chapin et al. | |
| 2006/0224470 A1 | 10/2006 | Garcia Ruano et al. | |
| 2006/0235726 A1 | 10/2006 | Paraison et al. | |
| 2006/0235739 A1 | 10/2006 | Levis et al. | |
| 2006/0253330 A1 | 11/2006 | Maggio et al. | |
| 2007/0124221 A1 | 5/2007 | Itoi et al. | |
| 2007/0244765 A1 | 10/2007 | Hunter et al. | |
| 2008/0077459 A1 | 3/2008 | Desai et al. | |
| 2008/0082427 A1 | 4/2008 | Gandhi et al. | |
| 2008/0103846 A1 | 5/2008 | Armstrong et al. | |
| 2008/0120206 A1 | 5/2008 | Weiler et al. | |
| 2008/0147507 A1 | 6/2008 | Langhammer | |
| 2008/0191881 A1 | 8/2008 | Minerley | |
| 2008/0198761 A1 | 8/2008 | Murawski et al. | |
| 2008/0201232 A1 | 8/2008 | Walker et al. | |
| 2008/0216001 A1 | 9/2008 | Ording et al. | |
| 2008/0228582 A1 | 9/2008 | Fordyce et al. | |
| 2008/0281792 A1 | 11/2008 | Pickett et al. | |
| 2008/0301095 A1 | 12/2008 | Zhu et al. | |
| 2009/0089148 A1 | 4/2009 | Gujjar et al. | |
| 2009/0222337 A1 | 9/2009 | Sergiades | |
| 2009/0259569 A1 | 10/2009 | Narea et al. | |
| 2009/0281884 A1 | 11/2009 | Selinger et al. | |
| 2009/0299794 A1 | 12/2009 | Marchi et al. | |
| 2010/0138037 A1 | 6/2010 | Adelberg et al. | |
| 2010/0169130 A1 | 7/2010 | Fineman et al. | |
| 2010/0174596 A1 | 7/2010 | Gilman et al. | |
| 2010/0234986 A1 | 9/2010 | Clopton et al. | |
| 2011/0010448 A1 | 1/2011 | Gill et al. | |
| 2011/0011931 A1 | 1/2011 | Farley et al. | |
| 2011/0034722 A1 | 2/2011 | Muroi et al. | |
| 2011/0042008 A1 | 2/2011 | Hori et al. | |
| 2011/0047022 A1 | 2/2011 | Walker et al. | |
| 2011/0054649 A1 | 3/2011 | Sarkis et al. | |
| 2011/0054992 A1 | 3/2011 | Liberty et al. | |
| 2011/0066504 A1 | 3/2011 | Chatow et al. | |
| 2011/0082734 A1 | 4/2011 | Zhang et al. | |
| 2011/0161207 A1 | 6/2011 | Moussavi et al. | |
| 2011/0191861 A1 | 8/2011 | Spears | |
| 2011/0213644 A1 | 9/2011 | Phene | |
| 2011/0225023 A1 | 9/2011 | Evens et al. | |
| 2011/0238577 A1 | 9/2011 | Shuster | |
| 2011/0246215 A1 | 10/2011 | Postma et al. | |
| 2011/0258083 A1* | 10/2011 | Ren | G06Q 10/087 |
| | | | 705/27.1 |
| 2011/0258117 A1 | 10/2011 | Ahmad et al. | |
| 2011/0313840 A1 | 12/2011 | Mason et al. | |
| 2011/0320246 A1 | 12/2011 | Tietzen et al. | |
| 2012/0016758 A1 | 1/2012 | Bouaziz et al. | |
| 2012/0041675 A1 | 2/2012 | Juliver et al. | |
| 2012/0054076 A1 | 3/2012 | Wu et al. | |
| 2012/0084119 A1 | 4/2012 | Vandehey et al. | |
| 2012/0095882 A1 | 4/2012 | Wolff | |
| 2012/0116810 A1 | 5/2012 | Knowlton et al. | |
| 2012/0209661 A1 | 8/2012 | Bennett et al. | |
| 2012/0271740 A1 | 10/2012 | Connors et al. | |
| 2012/0278154 A1 | 11/2012 | Lange et al. | |
| 2012/0278205 A1 | 11/2012 | Chin | |
| 2012/0311723 A1 | 12/2012 | Britt, Jr. et al. | |
| 2013/0006742 A1 | 1/2013 | Richard | |
| 2013/0046634 A1 | 2/2013 | Grigg et al. | |
| 2013/0066698 A1 | 3/2013 | Levy et al. | |
| 2013/0066733 A1 | 3/2013 | Levy et al. | |
| 2013/0124360 A1 | 5/2013 | Mitrovic | |
| 2013/0126610 A1 | 5/2013 | Aihara et al. | |
| 2013/0132140 A1 | 5/2013 | Amin et al. | |
| 2013/0132180 A1 | 5/2013 | Aihara et al. | |
| 2013/0132193 A1 | 5/2013 | Aihara et al. | |
| 2013/0132218 A1 | 5/2013 | Aihara et al. | |
| 2013/0132246 A1 | 5/2013 | Amin et al. | |
| 2013/0132887 A1 | 5/2013 | Amin et al. | |
| 2013/0166332 A1 | 6/2013 | Hammad | |
| 2013/0169413 A1 | 7/2013 | Schuessler | |
| 2013/0173435 A1 | 7/2013 | Cozad, Jr. | |
| 2013/0246176 A1 | 9/2013 | Chang et al. | |
| 2013/0246207 A1 | 9/2013 | Novak et al. | |
| 2013/0246301 A1 | 9/2013 | Radhakrishnan et al. | |
| 2013/0282392 A1 | 10/2013 | Wurm | |

(56) References Cited

U.S. PATENT DOCUMENTS

| | | | |
|---|---|---|---|
| 2013/0311211 A1 | 11/2013 | Zafar et al. | |
| 2013/0325554 A1 | 12/2013 | Ouimet | |
| 2013/0325672 A1* | 12/2013 | Odenheimer | G06Q 10/08 |
| | | | 705/28 |
| 2014/0012704 A1 | 1/2014 | Mizhen et al. | |
| 2014/0025524 A1 | 1/2014 | Sims et al. | |
| 2014/0046748 A1 | 2/2014 | Nagarajan et al. | |
| 2014/0067596 A1 | 3/2014 | McGovern et al. | |
| 2014/0067677 A1 | 3/2014 | Ali et al. | |
| 2014/0129135 A1 | 5/2014 | Holden et al. | |
| 2014/0129302 A1 | 5/2014 | Amin et al. | |
| 2014/0129951 A1 | 5/2014 | Amin et al. | |
| 2014/0149201 A1 | 5/2014 | Abbott et al. | |
| 2014/0164126 A1 | 6/2014 | Nichols et al. | |
| 2014/0173020 A1 | 6/2014 | Reilly et al. | |
| 2014/0180959 A1 | 6/2014 | Gillen et al. | |
| 2014/0222711 A1 | 8/2014 | Tibbs et al. | |
| 2014/0244416 A1* | 8/2014 | Venkat | G06Q 30/0603 |
| | | | 705/26.1 |
| 2014/0249941 A1 | 9/2014 | Hicks et al. | |
| 2014/0279035 A1 | 9/2014 | Fleming et al. | |
| 2014/0279204 A1* | 9/2014 | Roketenetz | G06Q 30/0631 |
| | | | 705/26.7 |
| 2014/0279241 A1 | 9/2014 | Bartholomew et al. | |
| 2014/0289167 A1 | 9/2014 | Rosenberg et al. | |
| 2014/0297470 A1 | 10/2014 | Ramadge et al. | |
| 2014/0330685 A1 | 11/2014 | Nazzari | |
| 2014/0344118 A1 | 11/2014 | Parpia et al. | |
| 2015/0066671 A1 | 3/2015 | Nichols et al. | |
| 2015/0073925 A1 | 3/2015 | Renfroe | |
| 2015/0095091 A1 | 4/2015 | Kamdar | |
| 2015/0100433 A1 | 4/2015 | Choy et al. | |
| 2015/0134552 A1 | 5/2015 | Engels et al. | |
| 2015/0161564 A1 | 6/2015 | Sweeney et al. | |
| 2015/0161714 A1 | 6/2015 | Fainshtein | |
| 2015/0166210 A1* | 6/2015 | Schram | G06Q 90/00 |
| | | | 705/500 |
| 2015/0178654 A1* | 6/2015 | Glasgow | G06Q 10/06315 |
| | | | 705/7.25 |
| 2015/0269521 A1 | 9/2015 | Knapp et al. | |
| 2015/0278912 A1* | 10/2015 | Melcher | H04W 76/14 |
| | | | 705/26.7 |
| 2015/0302510 A1* | 10/2015 | Godsey | G06Q 30/0635 |
| | | | 705/26.81 |
| 2015/0310383 A1 | 10/2015 | Iser et al. | |
| 2015/0310397 A1 | 10/2015 | Xu | |
| 2015/0332414 A1 | 11/2015 | Unser | |
| 2016/0086222 A1 | 3/2016 | Kurapati | |
| 2016/0092827 A1 | 3/2016 | Colodny et al. | |
| 2016/0104175 A1 | 4/2016 | Fanourgiakis et al. | |
| 2016/0275424 A1* | 9/2016 | Concannon | G06Q 10/06312 |
| 2016/0314528 A1 | 10/2016 | Abbott et al. | |
| 2016/0321677 A1 | 11/2016 | Dobaj | |
| 2017/0011423 A1 | 1/2017 | Douglas et al. | |
| 2017/0032382 A1 | 2/2017 | Shulman | |
| 2017/0236152 A1 | 8/2017 | Dimaunahan et al. | |
| 2017/0286980 A1 | 10/2017 | Winters et al. | |
| 2017/0345105 A1 | 11/2017 | Isaacson et al. | |
| 2018/0025442 A1 | 1/2018 | Isaacson et al. | |
| 2018/0101875 A1* | 4/2018 | Kim | G06Q 30/0202 |
| 2018/0150387 A1 | 5/2018 | Kogan et al. | |
| 2018/0204256 A1* | 7/2018 | Bifolco | G06Q 30/0625 |
| 2018/0232817 A1 | 8/2018 | Isaacson et al. | |
| 2018/0315111 A1* | 11/2018 | Alvo | G01G 19/4144 |
| 2018/0365753 A1* | 12/2018 | Fredrich | G06F 16/211 |
| 2019/0109916 A1* | 4/2019 | Varghese | H04L 67/26 |
| 2019/0266554 A1 | 8/2019 | Lin et al. | |
| 2019/0272497 A1* | 9/2019 | Tingler | G07G 1/14 |
| 2019/0287125 A1 | 9/2019 | Kumar et al. | |
| 2019/0295148 A1* | 9/2019 | Lefkow | G06Q 10/0833 |
| 2019/0310126 A1* | 10/2019 | Gurumohan | G06Q 10/087 |

OTHER PUBLICATIONS

Internal Revenue Bulletin: 2004-31 (Aug. 2, 2004) (hereinafter "IRS"). (Year: 2004).*
Steven (2016). Top 14 reasons why customers return purchases.3C Contact Services. ("Steven") (Year: 2016).*
Non-Final Office Action dated Aug. 28, 2018, for U.S. Appl. No. 14/522,208, of Cieri, M.M., et al., filed Oct. 23, 2014.
Non-Final Office Action dated Sep. 6, 2018, for U.S. Appl. No. 15/858,911, of Funk, M., et al., filed Dec. 29, 2017.
Non-Final Office Action dated Sep. 14, 2018, for U.S. Appl. No. 14/964,263, of Jen, M., et al., filed Dec. 9, 2015.
Final Office Action dated Sep. 24, 2018, for U.S. Appl. No. 14/700,044, of Brock, Z., et al., filed Apr. 29, 2015.
Advisory Action dated Oct. 30, 2018, for U.S. Appl. No. 14/800,090, of Tsou, V., filed Jul. 15, 2015.
Final Office Action dated Nov. 14, 2018, for U.S. Appl. No. 14/289,467, of Kumar, A., et al., filed May 28, 2014.
Advisory Action dated Dec. 5, 2018, for U.S. Appl. No. 14/700,044, of Brick Z., et al., filed Dec. 9, 2015.
Final Office Action dated Jan. 17, 2019, for U.S. Appl. No. 14/964,263, of Mark, J., et al. filed Dec. 9, 2015.
Final Office Action dated Jan. 25, 2019, for U.S. Appl. No. 14/522,208, of Cieri, M.M., et al., filed Oct. 23, 2014.
Notice of Allowance dated Jan. 29, 2019, for U.S. Appl. No. 15/858,911, of Funk, M., et al., filed Dec. 29, 2017.
Final Office Action dated Feb. 4, 2019, for U.S. Appl. No. 14/800,021, of Tsou, V., filed Jul. 15, 2015.
Final Office Action dated Feb. 6, 2019, for U.S. Appl. No. 14/964,231, of Jen, M., et al. filed Dec. 9, 2015.
Notice of Allowance dated Feb. 7, 2019, for U.S. Appl. No. 14/289,467, of Kumar, A., et al. , filed May 28, 2014.
Advisory Action dated Apr. 1, 2019, for U.S. Appl. No. 14/964,263, of Mark, J., et al. filed Dec. 9, 2015.
Advisory Action dated Apr. 22, 2019, for U.S. Appl. No. 14/522,208, of Cieri, M.M., et al., filed Oct. 23, 2014.
Advisory Action dated Apr. 24, 2019, for U.S. Appl. No. 14/800,021, of Tsou, V., filed Jul. 15, 2015.
Advisory Action dated Apr. 30, 2019, for U.S. Appl. No. 14/964,231, of Jen, M., et al., filed Dec. 9, 2015.
Non Final office Action dated May 31, 2019, for U.S. Appl. No. 14/800,021, of Tsou, V., filed Jul. 15, 2015.
Non Final Office Action dated Jun. 14, 2019, for U.S. Appl. No. 14/522,208, of Cieri, M.M., et al., filed Oct. 23, 2014.
Notice of Allowance dated Jun. 20, 2019, for U.S. Appl. No. 14/964,231, of Jen, M., et al., filed Dec. 9, 2015.
Non-Final Office Action dated Jun. 3, 2019, for U.S. Appl. No. 14/700,044, of Brock, Z., et al., filed Apr. 29, 2015.
Non-Final Office Action dated Jul. 30, 2019, for U.S. Appl. No. 14/964,263, of Jen, M., et al., filed Dec. 9, 2015.
Non Final Office Action dated Sep. 20, 2019, for U.S. Appl. No. 14/800,090, of Tsou, V., filed Jul. 15, 2015.
Bidgoli, H., "The Internet Encyclopedia", John Wiley and Sons, vol. 1, pp. 2735 (2004), Part 1.
Bidgoli, H., "The Internet Encyclopedia", John Wiley and Sons, vol. 1, pp. 2735 (2004), Part 2.
Bidgoli, H., "The Internet Encyclopedia", John Wiley and Sons, vol. 1, pp. 2735 (2004), Part 3.
Bidgoli, H., "The Internet Encyclopedia", John Wiley and Sons, vol. 1, pp. 2735 (2004), Part 4.
Bidgoli, H., "The Internet Encyclopedia", John Wiley and Sons, vol. 1, pp. 2735 (2004), Part 5.
Bidgoli, H., "The Internet Encyclopedia", John Wiley and Sons, vol. 1, pp. 2735 (2004), Part 6.
Bidgoli, H., "The Internet Encyclopedia", John Wiley and Sons, vol. 1, pp. 2735 (2004), Part 7.
Bidgoli, H., "The Internet Encyclopedia", John Wiley and Sons, vol. 1, pp. 2735 (2004), Part 8.
Bidgoli, H., "The Internet Encyclopedia", John Wiley and Sons, vol. 1, pp. 2735 (2004), Part 9.
Bidgoli, H., "The Internet Encyclopedia", John Wiley and Sons, vol. 1, pp. 2735 (2004), Part 10.
Bidgoli, H., "The Internet Encyclopedia", John Wiley and Sons, vol. 1, pp. 2735 (2004), Part 11.

(56) References Cited

OTHER PUBLICATIONS

Bidgoli, H., "The Internet Encyclopedia", John Wiley and Sons, vol. 1, pp. 2735 (2004), Part 12.
Bidgoli, H., "The Internet Encyclopedia", John Wiley and Sons, vol. 1, pp. 2735 (2004), Part 13.
Bidgoli, H., "The Internet Encyclopedia", John Wiley and Sons, vol. 1, pp. 2735 (2004), Part 14.
Bidgoli, H., "The Internet Encyclopedia", John Wiley and Sons, vol. 1, pp. 2735 (2004), Part 15.
Bidgoli, H., "The Internet Encyclopedia", John Wiley and Sons, vol. 1, pp. 2735 (2004), Part 16.
Bidgoli, H., "The Internet Encyclopedia", John Wiley and Sons, vol. 1, pp. 2735 (2004), Part 17.
Chen, F., and Samroengraja, R., "A Staggered Ordering Policy for One-Warehouse, Multiretailer Systems," Operations Research, vol. 48, Issue 2, pp. 281-293 (Apr. 1, 2000).
Cox, J.F., III, and Walker, E.D., II, "The Poker Chip Game: A Multi-product, Multi-customer, Multi-echelon, Stochastic Supply Chain Network Useful for Teaching the Impacts of Pull versus Push Inventory Policies on Link and Chain Performance," Informs Transactions on Education, vol. 6, Issue 3, pp. 3-19 (May 1, 2006).
Ross, D.F., "Replenishment Inventory Planning," Chapter 7 of Distribution Planning and Control: Managing in the Era of Supply Chain Management, Chapman & Hall, pp. 263-319 (1996).
Wah, B.W., "Wiley Encyclopedia of Computer Science and Engineering," Wiley—Interscience, vol. 1, pp. 1-2365 (Nov. 2008) Part 1.
Wah, B.W., "Wiley Encyclopedia of Computer Science and Engineering," Wiley—Interscience, vol. 1, pp. 1-2365 (Nov. 2008) Part 2.
Wah, B.W., "Wiley Encyclopedia of Computer Science and Engineering," Wiley—Interscience, vol. 1, pp. 1-2365 (Nov. 2008) Part 3.
Wah, B.W., "Wiley Encyclopedia of Computer Science and Engineering," Wiley—Interscience, vol. 1, pp. 1-2365 (Nov. 2008) Part 4.
Wah, B.W., "Wiley Encyclopedia of Computer Science and Engineering," Wiley—Interscience, vol. 1, pp. 1-2365 (Nov. 2008) Part 5.
Wah, B.W., "Wiley Encyclopedia of Computer Science and Engineering," Wiley—Interscience, vol. 1, pp. 1-2365 (Nov. 2008) Part 6.
Wah, B.W., "Wiley Encyclopedia of Computer Science and Engineering," Wiley—Interscience, vol. 1, pp. 1-2365 (Nov. 2008) Part 7.
Wah, B.W., "Wiley Encyclopedia of Computer Science and Engineering," Wiley—Interscience, vol. 1, pp. 1-2365 (Nov. 2008) Part 8.
Wah, B.W., "Wiley Encyclopedia of Computer Science and Engineering," Wiley—Interscience, vol. 1, pp. 1-2365 (Nov. 2008) Part 9.
Wah, B.W., "Wiley Encyclopedia of Computer Science and Engineering," Wiley—Interscience, vol. 1, pp. 1-2365 (Nov. 2008) Part 10.
Wah, B.W., "Wiley Encyclopedia of Computer Science and Engineering," Wiley—Interscience, vol. 1, pp. 1-2365 (Nov. 2008) Part 11.
Wah, B.W., "Wiley Encyclopedia of Computer Science and Engineering," Wiley—Interscience, vol. 1, pp. 1-2365 (Nov. 2008) Part 12.
Wah, B.W., "Wiley Encyclopedia of Computer Science and Engineering," Wiley—Interscience, vol. 1, pp. 1-2365 (Nov. 2008) Part 13.
"Uber-Android Apps on Google Play," dated Nov. 10, 2014, Retrieved from the Internet URL: https://play.google.com/store/apps/details?id=com.ubercab&hl=en, on Nov. 12, 2014, pp. 1-2.
Non-Final Office Action dated Apr. 24, 2017, for U.S. Appl. No. 14/700,044, of Brock, Z., et al., filed Apr. 29, 2015.
Non-Final Office Action dated Jun. 15, 2017, for U.S. Appl. No. 14/289,467, of Kumar, A., et al., filed May 28, 2014.
Non-Final Office Action dated Jun. 30, 2017, for U.S. Appl. No. 14/522,208, of Cieri, M., et al., filed Oct. 23, 2014.
Final Office Action dated Sep. 6, 2017, for U.S. Appl. No. 14/700,044, of Brock, Z., et al., filed Apr. 29, 2015.
Advisory Action dated Nov. 9, 2017, for U.S. Appl. No. 14/700,044, of Brock, Z., et al., filed Apr. 29, 2015.
Final Office Action dated Nov. 22, 2017, for U.S. Appl. No. 14/289,467, of Kumar, A., et al., filed May 28, 2014.
Final Office Action dated Nov. 24, 2017, for U.S. Appl. No. 14/522,208, of Cieri, M.M., et al., filed Oct. 23, 2014.
Non-Final Office Action dated Jan. 26, 2018, for U.S. Appl. No. 14/800,090, of Tsou, V., filed Jul. 15, 2015.
Non-Final Office Action dated Feb. 5, 2018, for U.S. Appl. No. 14/700,013, of Brock, Z., et al., filed Apr. 29, 2015.
Advisory Action dated Feb. 6, 2018, for U.S. Appl. No. 14/289,467, of Kumar, A., et al., filed May 28, 2014.
Non-Final Office Action dated Apr. 10, 2018, for U.S. Appl. No. 14/700,044, of Brock, Z., et al., filed Apr. 29, 2015.
Non-Final Office Action dated Apr. 18, 2018, for U.S. Appl. No. 14/289,467, of Kumar, A., et al., filed May 28, 2014.
Non-Final Office Action dated Jul. 6, 2018, for U.S. Appl. No. 14/800,021, of Tsou, V., filed Jul. 15, 2015.
Final Office Action dated Jul. 26, 2018, for U.S. Appl. No. 14/800,090, of Tsou, V., filed Jul. 15, 2015.
Non-Final Office Action dated Aug. 6, 2018, for U.S. Appl. No. 14/964,231, of Jen, M., et al., filed Dec. 9, 2015.
Final Office Action dated Aug. 15, 2018, for U.S. Appl. No. 14/700,013, of Brock, Z., et al., filed Apr. 29, 2015.
Final Office Action dated Dec. 27, 2019, for U.S. Appl. No. 14/522,208, of Cieri, M.M., et al., filed Oct. 23, 2014.
Final Office Action dated Jan. 22, 2020, for U.S. Appl. No. 14/964,263, of Jen, M., et al., filed Dec. 9, 2015.
Final office Action dated Jan. 29, 2020, for U.S. Appl. No. 14/800,021, of Tsou, V., filed Jul. 15, 2015.
Non Final Office Action dated Mar. 19, 2020, for U.S. Appl. No. 16/204,583, of Gjertson, N., et al., filed Nov. 29, 2018.
Final Office Action dated Mar. 20, 2020, for U.S. Appl. No. 14/800,090, of Tsou, V., filed Jul. 15, 2015.
Non Final Office Action dated Mar. 26, 2020, for U.S. Appl. No. 16/431,671, of Kumar, A., et al., filed Jun. 4, 2019.
Advisory Action dated Mar. 30, 2020, for U.S. Appl. No. 14/964,263, of Jen, M., et al., filed Dec. 9, 2015.
Non-Final office Action dated Jun. 12, 2020, for U.S. Appl. No. 14/800,021, of Tsou, V., filed Jul. 15, 2015.
Advisory Action dated Jun. 22, 2020, for U.S. Appl. No. 14/800,090, of Tsou, V., filed Jul. 15, 2015.
Non Final Office Action dated Jun. 29, 2020, for U.S. Appl. No. 14/964,263, of Jen, M., et al., filed Dec. 9, 2015.
Notice of Allowance dated Aug. 21, 2020, for U.S. Appl. No. 16/204,583, of Gjertson, N., et al., filed Nov. 29, 2018.
Notice of Allowance dated Oct. 8, 2020, for U.S. Appl. No. 16/204,583, of Gjertson, N., et al., filed Nov. 29, 2018.
Non-Final Office Action dated Jul. 15, 2020, for U.S. Appl. No. 14/700,013, of Brock, Z., et al., filed Apr. 29, 2015.
Non-Final Office Action dated Mar. 10, 2021, for U.S. Appl. No. 17/135,598, of Gjertson N., et al., filed Dec. 28, 2020.
Final Office Action dated Jun. 30, 2021, for U.S. Appl. No. 17/135,598, of Gjertson N., et al., filed Dec. 28, 2020.
Non-Final Office Action dated Oct. 27, 2021, for U.S. Appl. No. 17/135,598, of Gjertson N., et al., filed Dec. 28, 2020.
Final Office Action dated Feb. 18, 2022, for U.S. Appl. No. 17/135,598, of Gjertson N., et al., filed Dec. 28, 2020.
Notice of Allowance dated Jun. 8, 2022, for U.S. Appl. No. 17/135,598, of Gjertson N., et al., filed Dec. 28, 2020.
Corrected Notice of Allowance dated Jul. 6, 2022, for U.S. Appl. No. 17/135,598, of Gjertson N., et al., filed Dec. 28, 2020.
Advisory Action dated Sep. 3, 2021, for U.S. Appl. No. 17/135,598, of Gjertson N., et al., filed Dec. 28, 2020.

\* cited by examiner

INTELLIGENT INVENTORY SYSTEM

BACKGROUND

Merchant data may be aggregated and used for various purposes. In some instances, a merchant may desire to add an item to the merchant's inventory. However, the item may have one or more inherent and/or market-based issues with which the merchant may not be aware of, such as a defect. In such an instance, a merchant may suffer loss as a result of adding such an item to the merchant's inventory. Described herein are improvements in technology and solutions to technical problems that can be used to, among other things, inform merchants about items the merchants may wish to add to their inventory.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
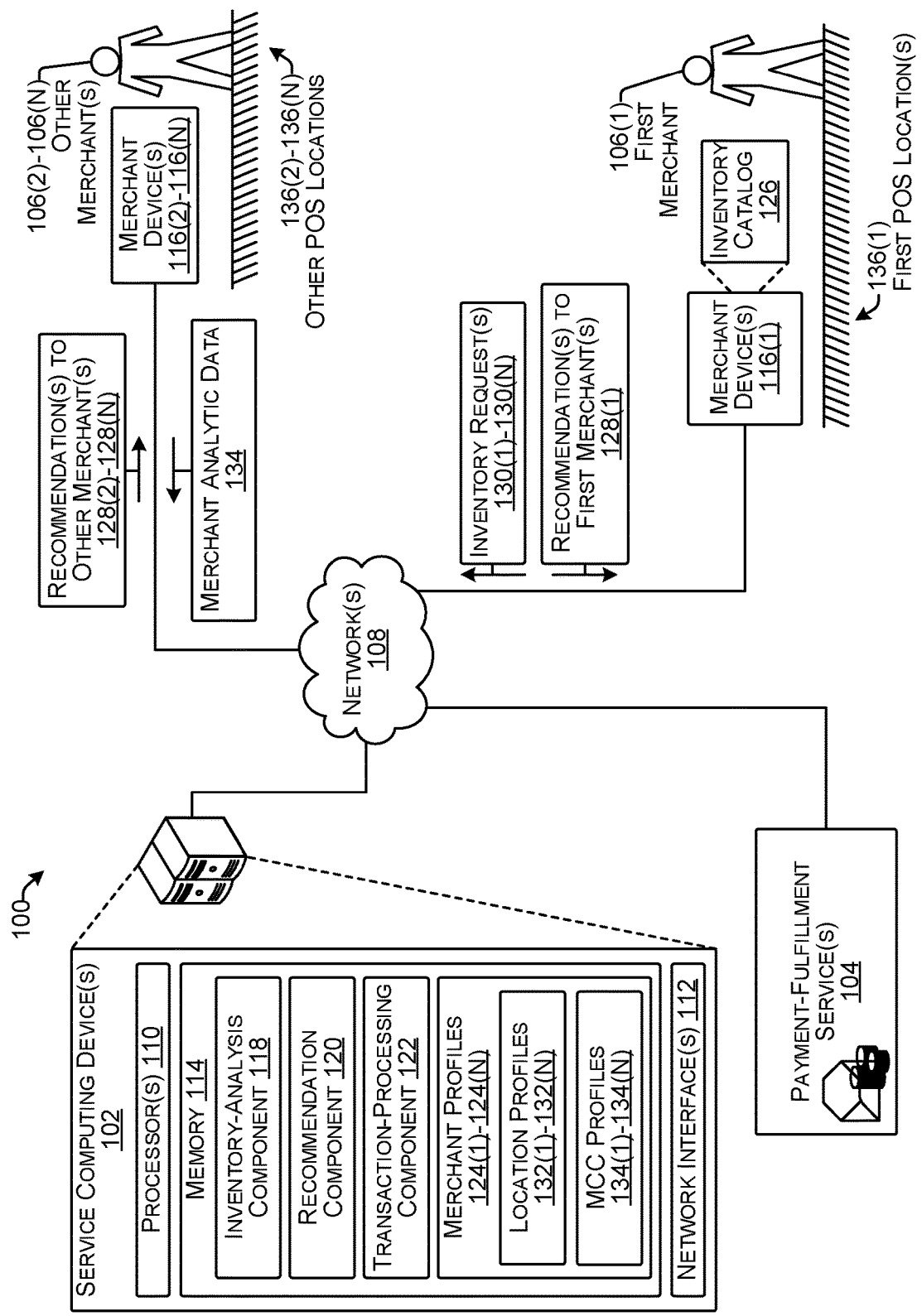
FIG. 1 illustrates a schematic diagram of an example environment for an intelligent inventory system.

Example systems and methods for intelligent inventory systems are described herein. As noted above, an item, which a merchant may wish to add to the merchant's inventory catalog, may have one or more inherent issues that the merchant may not be aware of. For example, the item may be defective and, as such, may be frequently returned by consumers to other, similarly-situated merchants in exchange for a different item or a refund. Accordingly, if the merchant adds the defective item to its inventory catalog, the merchant may suffer a loss in profit, potential clients, and/or other negative consequences.

Described herein are improvements in technology and solutions to technical problems that can be used to, among other things, inform merchants about items that they may wish to add to their inventory catalog. Traditional point-of-sale (POS) systems simply allow for merchants to add items to their inventory catalog for sale to consumers. As used herein, an inventory catalog may include a physical inventory, virtual inventory, digital inventory, and/or other inventory comprising items for sale by a merchant. Using the techniques described herein, merchants may be able to see real-time information associated with items that the merchant wishes to add to his or her inventory catalog. For instance, the techniques described herein may allow for a merchant to be automatically provided with time-sensitive pricing suggestions for one or more items offered for sale by the merchant. Additionally, merchants may be provided with location-specific inventory size and/or product recommendations. In this way, as a result of reducing the amount of Stock Keeping Units (SKUs) and/or other item information caused by returns and/or exchanges at the point-of-sale, the techniques described herein may improve memory allocation, network bandwidth, and/or promote more efficient/additional processing for POS devices.

In examples, a service provider may receive data from one or more merchant POS devices indicating a request to add one or more items to an inventory catalog associated with a merchant. For instance, the service provider may receive a request from a first merchant POS device of a first merchant to add an item, such as winter gloves for example, to the first merchant's inventory catalog. As used herein, a merchant POS device may include, but is not limited to, a smart phone, a tablet, a computing device, or another POS device used for processing transactions. In examples, the service provider may be a network-based transaction-processing service disposed between one or more payment-fulfilment services and one or more merchants.

As used herein, a transaction involves one or more customers using a POS card reader device that is coupled to a POS device executing a POS application. The POS card reader device may facilitate receiving a payment card from the customer for satisfying the transaction for goods and/or services provided by the merchant. Additionally, the POS application may facilitate sending read data attained from the payment card to a payment processing service or other service provider. Using the above described system/process, the service provider may then be enabled to analyze transaction data across merchants to understand return/exchange rates associated with items offered for sale by merchants to make recommendations that are populated on a POS application or other application of the merchant device. Additionally, the techniques described herein are not limited to POS systems, POS applications, and/or POS device; rather, the techniques described herein may be performed across a wide variety of systems, applications, and/or devices.

The service provider may further associate the first merchant making the inventory request with one or more similarly-situated merchants. For instance, the service provider may associate the first merchant with a second merchant that is located within a threshold distance of the first merchant. In these examples, the service provider may receive data in the form of GPS coordinates indicating that the two merchants are located within a certain geographic region and/or without a threshold distance from each other. Merchant analytic data from POS devices associated with the first merchant and the second merchant may be received and associated with each other for the purposes and operations described herein. Additionally, or alternatively, the service provider may associate the first merchant with a second merchant according to merchant analytic data indicating that the first merchant and the second merchant have a same merchant category code (MCC). In this way, the service provider may associate the two merchants according to types of items that the merchants sell and/or services that the merchants provide. Additional merchants and/or POS devices may also be associated with the first merchant based at least in part on the indications described above.

In examples, once the service provider has associated the first merchant with at least one similarly-situated merchant, the service provider may then determine one or more rates associated with the item that the first merchant is requesting to add to its inventory catalog. For instance, the service provider may determine a rate at which buyers return and/or exchange the item with the second merchant and/or other merchants. Additionally, or alternatively, the service provider may determine a rate at which a price for the item has fluctuated for the second merchant and/or other merchants as a function of staleness and/or time in merchants' inventories. Additionally, or alternatively, the service provider may determine a rate at which the item has been re-stocked and/or re-ordered by the second merchant and/or other merchants due to a consumer demand for the item as indicated by transaction activity occurring at a POS device of the second merchant and/or other merchants.

In further examples, the service provider may determine whether any of the one or more rates exceed a threshold rate and, if so, the service provider may send a suggestion to a merchant POS device associated with the first merchant requesting the item. For instance, the service provider may determine that the rate at which buyers return the item to the second merchant and/or other merchants exceeds the threshold rate for returns. Accordingly, the service provider may send a suggestion to the POS device of the first merchant suggesting a new item to add to the first merchant's inventory catalog rather than the original item requested. Additionally, or alternatively, the service provider may determine that the rate at which the price of the item has fluctuated for the second merchant as a function of staleness and/or time in inventory exceeds the threshold rate for price fluctuation. As such, the service provider may send a suggestion to the POS device of the first merchant suggesting a price to charge for the item. Additionally, or alternatively, the service provider may determine that the rate at which the item is re-stocked and/or re-ordered by the second merchant and/or other merchants exceeds the threshold rate for re-stocking. Accordingly, the service provider may send a suggestion to the POS device of the first merchant suggesting a quantity of the item to order for the first merchant's inventory catalog.

As noted above, in examples, a merchant may desire to add an item to the merchant's inventory catalog that may be defective. Additionally, or alternatively, the item may be less desirable than another, more popular item. Take, for example, an item that is annually upgraded to a newer and/or improved version, such as ski boots. In such an example, if a merchant adds an old version of ski boots to the merchant's inventory catalog rather than a new version of ski boots, it may not be profitable because consumers will desire the newer version over the older version. Using the techniques described herein, a service provider may determine a rate at which old versions of ski boots are returned and/or exchanged for new versions of ski boots for similarly-situated ski boot merchants. In this way, if the rate exceeds the threshold rate for returns, the service provider may send a suggestion to a POS device of the merchant suggesting that the merchant consider ordering the new version of ski boots rather than the old version. Additionally, or alternatively, the service provider may also send a suggestion to the merchant POS device suggesting a price to charge for the new version of the boots and/or suggesting a quantity to order.

In examples, a merchant may desire to add an item to the merchant's inventory catalog that may be subject to price fluctuation. Take, for example, winter gloves or another seasonal item. If, for instance, a first merchant adds winter gloves to its inventory catalog near the end of the cold season, the winter gloves may be considered stale inventory that the first merchant cannot sell until the cold season returns. Using the techniques described herein, a service provider may determine that one or more similarly-situated merchants have recently cut prices for winter gloves. Accordingly, the service provider may send a suggestion to a POS device of the first merchant suggesting a new price to charge for the winter gloves. Additionally, or alternatively, the service provider may suggest a second item for the first merchant to order rather than the winter gloves and/or a recommended quantity to order of the winter gloves (e.g., suggest change of merchant purchase order for winter gloves to 10 rather than 20 due to end of season and overstock probability).

In further examples, a merchant may desire to add an item to the merchant's inventory catalog that other, similarly-situated merchants have had success selling. Take, for example, a popular video game console. In some examples, a first merchant may not know a target quantity of video game consoles that should be ordered for stock in inventory. In such examples, the first merchant may order too few or too many video game consoles. However, using the techniques described herein, a service provider may determine a rate at which the video game console is re-stocked by at least a second, competing merchant that is determined to be similarly-situated. As such, the service provider may send a suggested quantity of video game consoles to order to a POS device associated with the first merchant. Alternatively, or additionally, the service provider may send a suggestion to the first merchant suggesting the first merchant purchase a second item rather than, or in addition to, the video game console. Alternatively, or additionally, the service provider may send a suggested price to charge for the video game console and/or the second item to the POS device of the first merchant.

In examples, merchants may select to have their respective merchant analytic data gathered by the service provider for receiving inventory suggestions. For example, a merchant may not want to share his or her company information with competing merchants. In such an example, the merchant may elect to not have his or her merchant analytic data shared with the service provider. As another example, a merchant may wish to provide the service provider with only certain merchant analytic data, such as a respective location associated with the merchant, items sold by the merchant, and/or other merchant analytic data.

The present disclosure provides an overall understanding of the principles of the structure, function, manufacture, and use of the systems and methods disclosed herein. One or more examples of the present disclosure are illustrated in the accompanying drawings. Those of ordinary skill in the art will understand that the systems and methods specifically described herein and illustrated in the accompanying drawings are non-limiting embodiments. The features illustrated or described in connection with one embodiment may be combined with the features of other embodiments, including as between systems and methods. Such modifications and variations are intended to be included within the scope of the appended claims.

Additional details are described below with reference to several example embodiments.

FIG. 1 illustrates a schematic diagram of an example environment for an intelligent inventory system. The system 100 may include service computing device(s) 102 disposed between one or more payment-fulfillment services 104 and merchants, such as a first merchant 106(1) and other merchants 106(2)-106(N) (collectively referred to as "merchants 106"), where N represents an integer greater than or equal to one. The service computing devices 102 may be in communication with the payment fulfillment services 104 and the merchants 106 via a network 108.

In examples, the service computing device 102 may comprise processor(s) 110, network interface(s) 112, and memory 114. As used herein, a processor, such as processor(s) 110, may include multiple processors and/or a processor having multiple cores. Further, the processors may comprise one or more cores of different types. For example, the processors may include application processor units, graphic processing units, and so forth. In one implementation, the processor may comprise a microcontroller and/or a microprocessor. The processor(s) 110 may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 110 may possess its own local memory, which also may store program components, program data, and/or one or more operating systems.

The network interface(s) 112 may enable communications between the components and/or devices shown in system 100 and/or with one or more other remote systems, as well as other networked devices. Such network interface(s) 112 may include one or more network interface controllers (NICs) or other types of transceiver devices to send and receive communications over the network 108. For example, the network interface(s) may enable the service computing device(s) 102 to communicate via the network 108 with payment-fulfillment service(s) 104 and merchant device(s) 116(1), 116(2), . . . 116(N) (collectively "merchant devices 116"), where N is an integer greater than or equal to one.

For instance, the network interface(s) 112 may include a personal area network (PAN) component to enable communications over one or more short-range wireless communication channels. For instance, the PAN component may enable communications compliant with at least one of the following standards IEEE 802.15.4 (ZigBee), IEEE 802.15.1 (Bluetooth), IEEE 802.11 (WiFi), or any other PAN communication protocol. Furthermore, the network interface(s) 112 may include a wide area network (WAN) component to enable communication over a wide area network.

As noted above, the service computing device 102 may also comprise memory. The memory 114 may include volatile and nonvolatile memory, removable and non-removable media implemented in any method or technology for storage of information, such as computer-readable instructions, data structures, program component, or other data. Such memory 114 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory 114 may be implemented as computer-readable storage media ("CRSM"), which may be any available physical media accessible by the processor(s) 110 to execute instructions stored on the memory 114. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 110.

Further, functional components may be stored in the respective memories, or the same functionality may alternatively be implemented in hardware, firmware, application specific integrated circuits, field programmable gate arrays, or as a system on a chip (SoC). In addition, while not illustrated, each respective memory, such as memory 114, discussed herein may include at least one operating system (OS) component that is configured to manage hardware resource devices such as the network interface(s) 112 and so forth, and provide various services to applications or components executing on the processors. Such OS component may implement a variant of the FreeBSD operating system as promulgated by the FreeBSD Project; other UNIX or UNIX-like variants; a variation of the Linux operating system as promulgated by Linus Torvalds; the FireOS operating system from Amazon.com Inc. of Seattle, Washington, USA; the Windows operating system from Microsoft Corporation of Redmond, Washington, USA; LynxOS as promulgated by Lynx Software Technologies, Inc. of San Jose, California; Operating System Embedded (Enea OSE) as promulgated by ENEA AB of Sweden; and so forth.

In examples, the memory 114 may also comprise an inventory-analysis component 118, a recommendation component 120, a transaction-processing component 122, and merchant profiles 124(1)-124(N) (collectively "merchant profiles 124"), where N is any integer greater than or equal to one. The inventory-analysis component 118 may receive merchant analytic data 134 from the merchants 106 and determine one or more rates associated with one or more items offered for sale by the merchants 106. For instance, the inventory-analysis component 118 may determine a rate at which consumers return and/or exchange one or more items from the merchants 106. Alternatively, or additionally, the inventory-analysis component 118 may determine a rate at which a price for an item has fluctuated for the merchants 116 and/or a rate at which an item is re-stocked by the merchants 116. The inventory-analysis component 118 may further determine whether one of the determined rates exceeds a threshold rate. For instance, the inventory-analysis component 118 may determine that it is not profitable for a merchant to carry an item in the merchant's inventory catalog 126 if the item is returned and/or exchanged by consumers more than ten times per month.

In examples, the inventory-analysis component 118 may determine one or more rates. The one or more rates may be in the form of a percentage. For example, a rate may indicate a percentage of the likeliness that an item is returned and/or exchanged. Additionally, or alternatively, the one or more rates may be in the form of an average. For instance, a rate may indicate an average price charged by merchants for a specific item during the summer. Additionally, or alternatively, the one or more rates may be in the form of a maximum value. For example, a rate may indicate the maximum amount of times an item has been re-stocked and/or re-ordered for a given merchant. Additionally, or alternatively, the one or more rates may comprise a standard deviation value, a minimum value, a median value, and/or another rate value.

In examples, the inventory-analysis component 118 may receive merchant analytic data 134 associated with a merchant's inventory, and analyze the data to generate one or more rates. As such, the inventory-analysis component 118 may receive an inventory amount for specific items stocked by a merchant, and compute a suggested inventory amount for other merchants to carry. For example, the inventory-analysis component 118 may receive merchant analytic data 134 from merchants indicating that the merchants each stock somewhere between twenty and twenty-five pairs of gloves for sale each. Accordingly, the inventory-analysis component 118 may compute that, on average, the merchants stock twenty-two pairs of gloves for sale at a time. Accordingly, the inventory-analysis component 118 may offer suggestions to other merchants that they should carry twenty-two pairs of glove in stock for sale at any given time.

Alternatively, or additionally, the inventory-analysis component 118 may compute return rates based on transaction activity occurring at the POS device of the merchant or receive rates as generated by the merchant devices 116. In this way, the service computing device 102 or merchant devices 116 may calculate a rate for how many times an item offered by a merchant has been returned and/or exchanged. For example, a merchant POS device may determine that a specific item offered for sale by the merchant is returned and/or exchanged an average of ten times per month based on transaction activity occurring at merchant POS. Accordingly, the inventory-analysis component 118 may receive merchant analytic data 134 in the form of a computed average rate for returns and/or exchanges of the item, and offer suggestions to other merchants based on the computed average rate.

In examples, the inventory-analysis component 118 may determine threshold rates for specific items offered for sale by merchants. The threshold rates may be calculated differently for each rate category, and may comprise different values. For example, a threshold rate at which buyers of an item return and/or exchange a particular item after purchase may be set at thirty times per year based on attributes or category of the item for example (e.g., electronics may have a higher return threshold rate than furniture goods). In this way, if an item is returned and/or exchanged more than thirty times per year, for example, the item may exceed the threshold rate. As another example, a threshold rate at which a price for an item fluctuates as a function of staleness or time spent in inventory may be set to one-hundred dollars. Accordingly, if the price for an item fluctuates more than one-hundred dollars in a year, the item may exceed the threshold rate, and a suggestion may be offered to merchants selling the item. As yet another example, a threshold rate at which an item is re-stocked and/or re-ordered by merchants may be set to ten times per year. In this way, if an item is ordered more than ten times per year, merchants ordering the item may be given a suggestion to order a larger quantity of the item. Additionally, or alternatively, the threshold rates may be calculated based on an item's profitability. For example, the inventory-analysis component 118 may calculate an amount of times that an item may be returned and/or exchanged per year before the merchant begins to lose profit.

In examples, the memory 114 may also comprise a recommendation component 120 for sending the merchants 116 one or more recommendation(s) 128(1), 128(2), . . . 128(N) (collectively "recommendations 128"), where N is any number greater than or equal to one. For instance, the recommendation component 118 may send inventory recommendations 128 to the merchant device(s) 116 suggesting that the merchants 106 add certain items to their inventory catalog 126. Alternatively, or additionally, the recommendation component 120 may send a suggested price to charge for an item and/or send a suggested amount of an item to purchase for a merchant's inventory catalog 126. In examples, the recommendation component 120 may send the inventory recommendation(s) 128 to the merchant devices 116 in response to receiving inventory request(s) 130(1)-130(N) from the merchant devices 116.

In examples, by using predictive learning techniques, the recommendation component 120 may proactively target merchants who are prone to ordering too few of items to stock in their inventory catalog 126. In this way, accessible merchant analytic data 134 may be utilized to increase merchant profits associated with missing sales due to not carrying enough stock during peak sale times. In contrast to conventional techniques involving human decision-makers, the techniques described herein allow the recommendation component 120 to make real-time and/or automated predictions and determinations regarding merchant inventory catalogs 126, whether a recommendation 128 should be sent to a merchant, the type of suggestion, etc. with improved speed and accuracy.

Additionally, the rules, algorithms, and various techniques described herein are designed to be implemented utilizing computerized components, as described herein, and could not be performed by human decision-makers while achieving the same results. In addition, the results achieved from the combination of steps performed and/or data points considered, allow the algorithms and machine learning techniques to constantly improve the functioning of the computerized components. For example, by more accurately predicting merchants at risk for ordering a defective item, based on a specific method and/or data points, the recommendation component 120 may send out fewer suggestions to merchants, suggestions less frequently, etc. as a result of determining/predicting which merchants to target, the type of suggestion to send, when to send the suggestion, and/or the content of the suggestion. More specifically, since the recommendation component 120 can determine/predict characteristics of suggestions with greater accuracy, to increase efficacy of the suggestions, the computer may utilize less resources sending extraneous suggestions. In addition, by refining the process using machine learning techniques and iterative algorithms, the service computing device(s) 102 may increase efficiency as more data points are collected.

Also, the merchant recommendations 128, or suggestions, described herein are time-sensitive in nature and configured to be sent to a merchant device 116 in real-time for display on the merchant POS device via an interface, application program, etc. In this way, the suggestions will cause the merchant POS device to display the suggestion in a timely manner and increase the likelihood that the merchant will interact with the suggestion and adjust his/her inventory catalog 126 accordingly.

The memory 114 may also comprise a transaction-processing component 122. In examples, the transaction-processing component 122 may receive transaction information from the merchant devices 116 via the network(s) 108, and send the transaction information to the payment-fulfillment service(s) 104. In examples, the transaction information may comprise bank account numbers, credit card account numbers, and/or the like.

The transaction-processing component 122, in examples, may bill a merchant in response to the merchant selecting an item to add to the merchant's inventory catalog 126. For example, a merchant may select an item to add to the merchant's inventory catalog 126 based in part on a recommendation 128 sent to the merchant. In response the transaction-processing component 122 may determine the quantity of items ordered by the merchant and accordingly charge an account associated with the merchant, such as a credit card account, bank account, checking account, and/or the like. In other examples, the transaction-processing component 122 may handle transactions initiated by a consumer purchasing an item from a merchant. For example, the consumer may select an item to buy from the merchant's inventory catalog 126, and the transaction-processing component 122 may accordingly charge an account associated with the consumer.

As noted above, the memory 114 may also comprise merchant profiles 122. In examples, the merchant profiles 122 may be categorized into location profiles 132(1)-132(N) (collectively "location profiles 132") and/or MCC (merchant category code) profiles 134(1)-134(N) (collectively "MCC profiles 134"), where N is any integer greater than or equal to one. For instance, depending on a geographic proximity of a first POS location 136(1) to other POS locations 136(2)-136(N) (collectively "POS locations 136"), two merchants located in the same city, region, state, country, and/or the like may be placed into the same location profile 132. Additionally, or alternatively, two merchants located within a specified radius of each other may be within a threshold distance and accordingly placed into the same location profile, regardless of geographic destinations. For example, two merchants located within a one-hundred-mile radius of each other may be placed into the same location category. In examples, a merchant may additionally be able to choose a threshold distance for a location profile the merchant wants to be associated with.

Alternatively, or additionally, two merchants who sell similar items, services, and/or the like may be placed into the same MCC profile 134. A single merchant may further be placed into several different merchant profiles based on the merchant's location and MCC. Take for example a merchant who sells skiing gear, camping gear, climbing gear, and/or the like. Such a merchant may be placed into a skiing profile, camping profile, climbing profile, and potentially other MCC profiles. Additionally, or alternatively, the merchant may be placed into several different location profiles 132 based on the merchant's location, such as a city location profile, state location profile, and/or the like.

In examples, the merchant profiles 122 may be generated utilizing, for example, one or more machine learning techniques. The merchant profiles 122 may be utilized to determine a probability of an outcome occurring, such as for determining a number of items to likely be sold by similarly-situated merchants. These merchant profiles 122 may be described herein as predictive models.

A predictive model may include one or more models that utilize predictive analytics to determine one or more outcomes. Predictive analytic techniques may include, for example, predictive modelling, machine learning, and/or data mining. Generally, predictive modelling may utilize statistics to predict outcomes. Machine learning, while also utilizing statistical techniques, may provide the ability to improve outcome prediction performance without being explicitly programmed to do so. A number of machine learning techniques may be employed to generate and/or modify the layers and/or models describes herein. Those techniques may include, for example, decision tree learning, association rule learning, artificial neural networks (including, in examples, deep learning), inductive logic programming, support vector machines, clustering, Bayesian networks, reinforcement learning, representation learning, similarity and metric learning, sparse dictionary learning, and/or rules-based machine learning.

Figure 2:
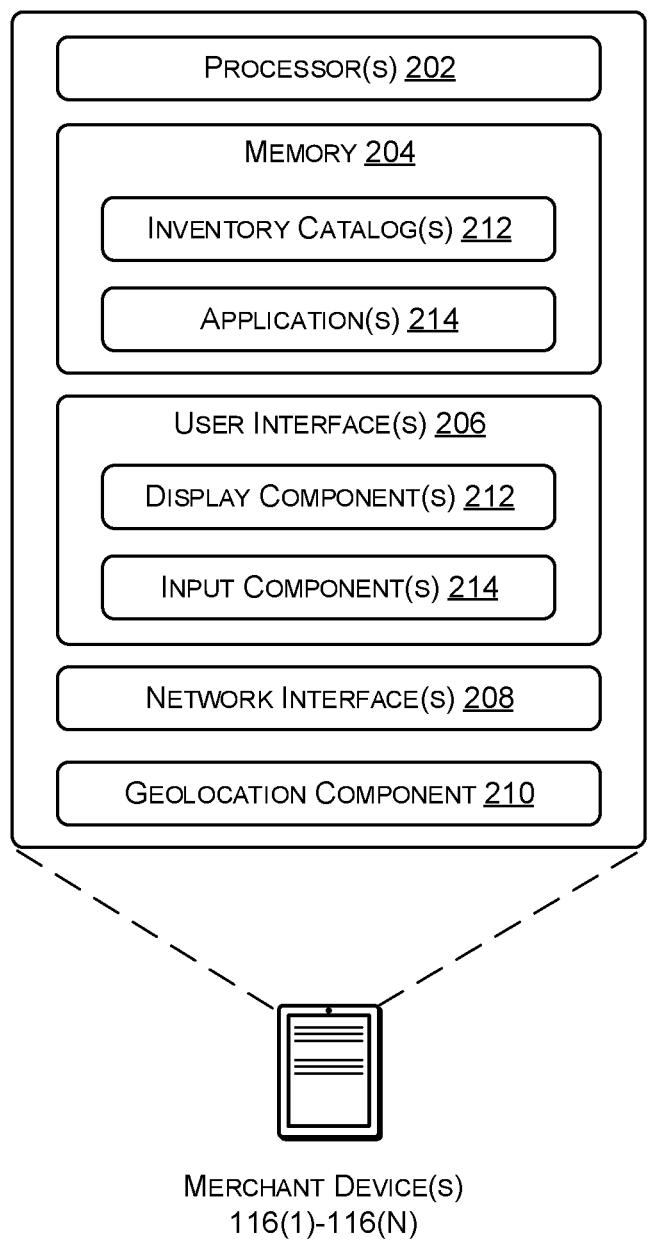
FIG. 2 illustrates a schematic diagram of example components of a merchant device.

FIG. 2 illustrates a schematic diagram of example components of a merchant device, such as merchant devices 116. In examples, merchant devices 116 may comprise processor(s) 202, memory 204, user interfaces(s) 206, network interface(s) 208, and/or a geolocation component 210.

The processor(s) 202, memory 204, and network interface(s) 208 may be the same as or similar to the processor(s), memory, and/or network interface(s) described with respect to FIG. 1. As shown in FIG. 2, the memory 204 of the merchant devices 116 may also comprise inventory catalog(s) 212 for the merchant. In examples, the inventory catalog(s) 212 may store data corresponding to a quantity and/or type of physical items offered for sale by the merchant. For instance, a ski shop merchant's inventory catalog may store data corresponding to an amount of ski boots, ski poles, and/or helmets the merchant has left in inventory. Alternatively, or additionally, the inventory catalog(s) 212 may store data corresponding to services that a merchant provides. For example, the ski shop merchant's inventory catalog may store data corresponding to services provided by the ski shop merchant, such as waxing, sharpening, fitting, and the like.

The memory 204 of the merchant devices 116 may further comprise application(s) 214. In examples, the application(s) 214 may include a point-of-sale (POS) application that provides functionality for a merchant to accept payment for goods and/or services. The application(s) 214 may be initiated based on receiving a suggestion from a service computing device associated with a transaction-processing service. For instance, the application may be initiated based at least in part on receiving suggestions from a service computing device that causes the application to display one or more suggestions associated with the merchant's inventory catalog.

As noted above, the merchant devices 116 may also comprise user interface(s) 206. In examples, the user interface(s) 206 may comprise display component(s) 212 such as an LED display, a plasma display, a liquid crystal display (LCD), a touchscreen display, and/or other display components. Additionally, or alternatively, the user interfaces(s) 206 may comprise input component(s) 214. For instance, the user interface(s) 206 may comprise a mouse, keyboard, touchscreen, microphone, webcam, touchpad, and other input components.

As noted above, the merchant devices 116 may further comprise a geolocation component 210. The geolocation component 210 may include a GPS device able to indicate location information, or the geolocation component 210 may comprise another location-based sensor. The merchant devices 116 may also include one or more additional sensors (not shown), such as an accelerometer, gyroscope, compass, proximity sensor, and the like. Such additional sensors may be essential in determining accurate location data corresponding to a POS device's location. Additionally, such additional sensors may provide added redundancy for the geolocation component 210.

In examples, the geolocation component 210 may perform geo-fencing to define merchant locations. The geolocation component 210 may be used to establish a radius for an MCC profile of a merchant. Take, for instance, a merchant who operates a mobile business, such as a food truck. In such instances, the merchant may use geo-fencing to establish a radius for receiving merchant analytic data associated with merchant locations. In this way, if the merchant's food truck is constantly changing geographic locations, the merchant may use geo-fencing to update the merchant's location every time the merchant's location changes.

Additionally, the merchant devices 116 may include various other components that are not shown, examples of which include removable storage, a power control unit, and so forth.

Figure 3:
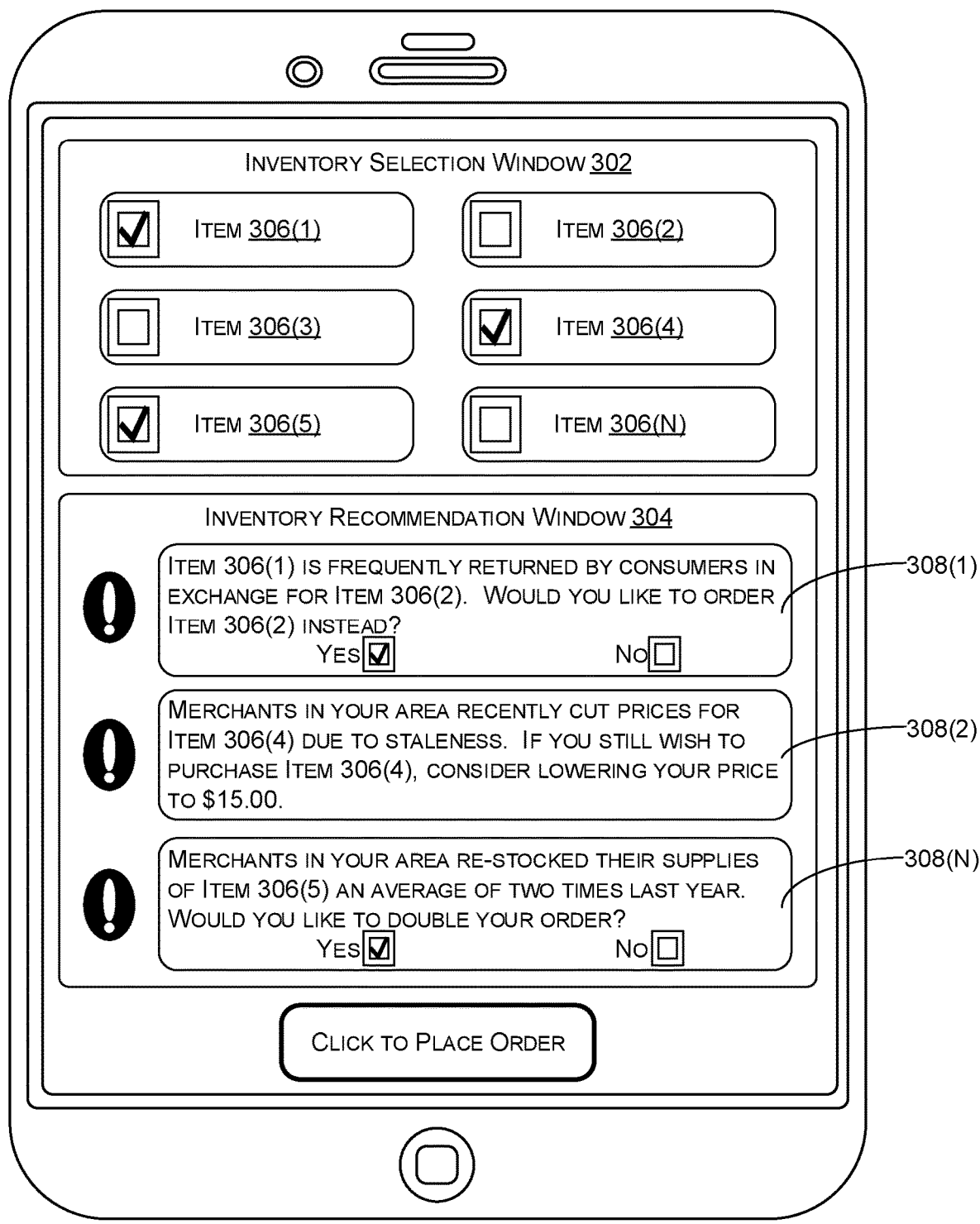
FIG. 3 illustrates an example user interface of a merchant device.

FIG. 3 illustrates an example user interface of a merchant device. In examples, the user interface of the merchant device 300 may, at times, display an inventory selection window 302. The inventory selection window 302 may comprise one or more items 306(1), 306(2), . . . 306(N) (collectively "items 306"), where N is any integer greater than or equal to one. In examples, the items 306 may be individually selected by a merchant to be added to the merchant's inventory catalog. Additionally, or alternatively, the items 306 may be selected in response to a merchant entering one of an item name, an item number, a part number, a picture of the item, and/or another item identifier. For example, a merchant may type an item number associated with the item into a search field. In response, the user interface may produce the item associated with the item number for the merchant to order so as to facilitate an adjustment to the purchase order.

Additionally, or alternatively, the merchant device 300 may, at times, display an inventory recommendation window 304. In examples, the inventory recommendation window may display one or more suggestions 308(1), 308(2), . . . 308(N) (collectively "suggestions 308"), where N is any integer greater than or equal to one. For instance, the suggestions 308 may offer different items 306 to the merchant rather than an item currently selected by the merchant. In examples, the inventory recommendation window may be populated with one or more suggestions 308 and interactive or actionable elements in response to a merchant selecting one or more items 306. As an illustrative example, FIG. 3 shows some of the many suggestions 308 a merchant may receive in response to selecting on or more items 306.

In examples, the suggestions 308 may comprise data. For example, the suggestions 308 shown in FIG. 3 may include text describing what the suggestion is. Additionally, or alternatively, the suggestions 308 may include selectable components for accepting or not-accepting the suggestion, such as suggestions 308(1) and 308(N). In examples, the suggestions 308 may comprise a narrative about why something is being suggested. For example, a suggestion may comprise an explanation, similar to that of suggestion 308 (1), stating that a second item is being suggested rather than a first item based at least in part on the first item having a high rate of returns and/or exchanges.

In examples, a merchant may make a selection based on the suggestion. For instance, like suggestion 308(1), the suggestion may include an option to purchase a second item rather than a first item. Accordingly, the merchant may select whether he/she wants to continue with purchasing the first item or, instead, order the second item.

In examples, the merchant POS device may generate data, in response to receiving a merchant input associated with one or more suggestions 308. For instance, the merchant POS device may generate data that is sent to a service computing device in response to the merchant selecting one or more suggestions. In response, a service computing device may automatically update the inventory catalog of the merchant POS device and/or order one or more items associated with the suggestion. Additionally, the data generated by the POS device may automatically adjust an active purchase order of the merchant. Traditionally, when a merchant is ordering items for his or her inventory, the merchant may have to go back and update his or her purchase order to reflect changes made as a result of learning about a defective product. However, because the interactive elements of the suggestions provided to the merchant may be linked to the purchase order of merchant, the purchase order may be automatically updated to reflect a selection made by the merchant. Additionally, or alternatively, the interactive elements may be displayed at or near a time when the user is interacting with a purchase order, allowing for time-sensitive information to be presented and for tangible changes to the purchase order to be made on the fly. Accordingly, this may save a merchant time and reduce user error for updating a purchase order.

In examples, the merchant POS device may receive voice inputs from a merchant for the purpose of responding to suggestions 308. For example, a merchant may respond to suggestion 308(2) by saying "Yes, lower the price of item 306(4) to $15.00 in my inventory catalog. Accordingly, the merchant POS device may generate data associated with the voice input. In examples, the merchant POS device may send the voice input data to the service computing device so that the service computing device may automatically adjust the inventory catalog of the merchant according to the voice input.

FIGS. 4-8 illustrate example processes for an intelligent inventory system. The processes described herein are illustrated as collections of blocks in logical flow diagrams, which represent a sequence of operations, some or all of which may be implemented in hardware, software or a combination thereof. In the context of software, the blocks may represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation, unless specifically noted. Any number of the described blocks may be combined in any order and/or in parallel to implement the process, or alternative processes, and not all of the blocks need be executed. For discussion purposes, the processes are described with reference to the environments, architectures and systems described in the examples herein, such as, for example those described with respect to FIGS. 1-3, although the processes may be implemented in a wide variety of other environments, architectures and systems.

Figure 4:
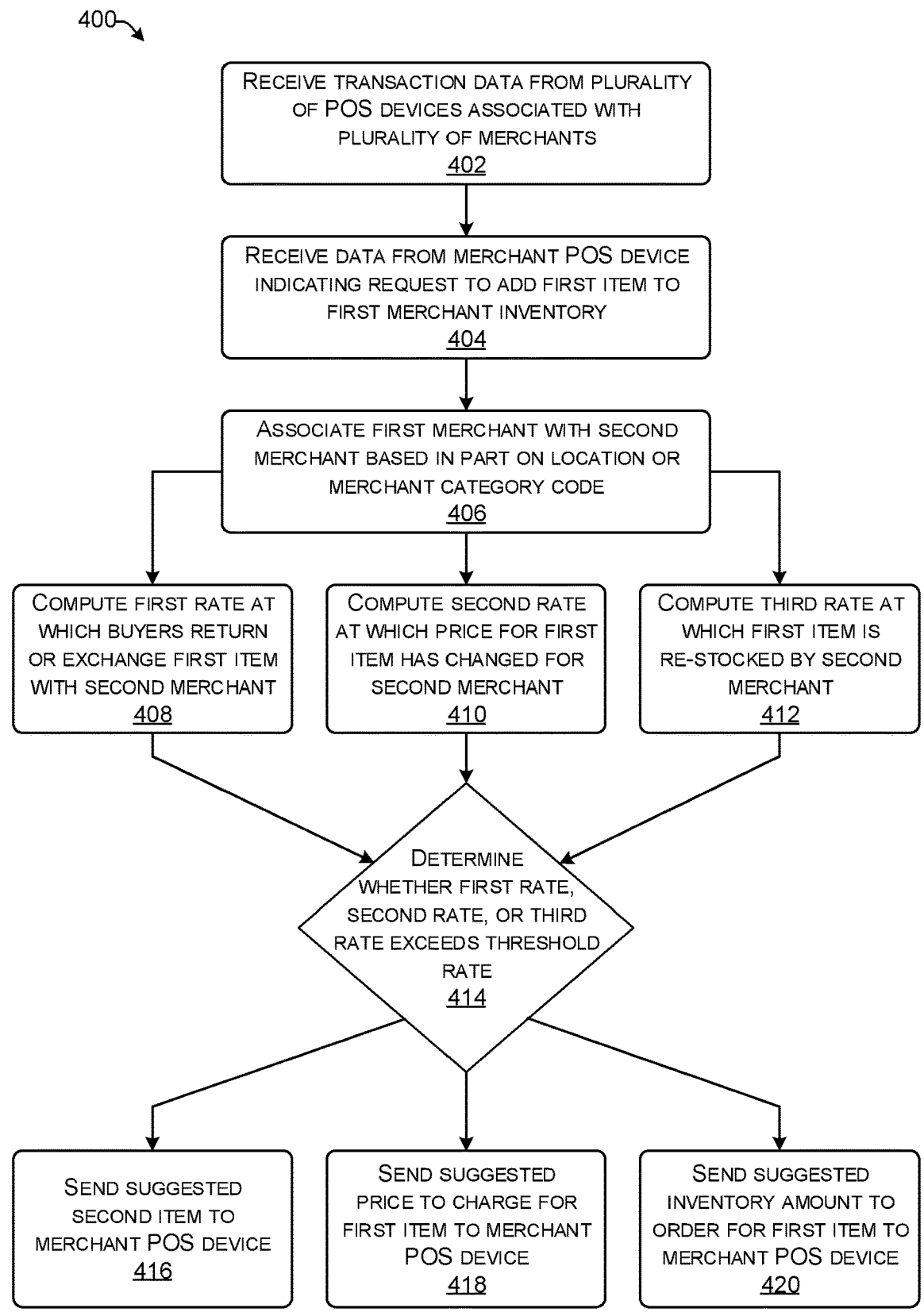
FIG. 4 illustrates a logic flow diagram of an example process for an intelligent inventory system.

FIG. 4 illustrates a logic flow diagram of an example process 400 for an intelligent inventory system. The order in which the operations or steps are described is not intended to be construed as a limitation, and any number of the described operations may be combined in any order and/or in parallel to implement process 400.

At block 402, the process 400 may include receiving transaction data from a plurality of merchant POS devices associated with a plurality of merchants. In examples, the transaction data may include an amount of times a specific item has been returned and/or exchanged by a customer for one or more merchants of the plurality of merchants. Additionally, or alternatively, the transaction data may indicate a price change as a function of time spent in inventory (staleness) for a specific item for one or more merchants. Additionally, or alternatively, the transaction data may include an amount of times that a specific item has been re-stocked or re-ordered by one or more merchants of the plurality of merchants to meet a consumer demand associated with the specific item. In further examples, the transaction data may indicate one or more of the above noted features for any item sold by a merchant of the plurality of merchants. Furthermore, the transaction data supplied by the plurality of merchants is not limited to the above examples, and may indicate any unique statistic associated with an item stocked or sold by a merchant.

At block 404, the process 400 may include receiving data from a merchant point-of-sale (POS) device associated with a first merchant. The data may indicate a request to add a first item to an inventory catalog associated with the first merchant. In examples, the data may have been sent from the merchant POS device in response to the first merchant selecting the first item. Alternatively, or additionally, the data may have been sent in response to the merchant POS device detecting that a quantity of the first item stored in the first merchant's inventory catalog was low.

At block 406, the process 400 may include associating the first merchant with a second merchant. The second merchant may be similarly-situated the first merchant with respect to a location of the first merchant and/or a merchant category code (MCC) of the first merchant. For instance, the first merchant may be associated with the second merchant based at least in part on geolocation data indicating that the first merchant is located within a threshold distance of the second merchant. Alternatively, or additionally, the first merchant may be associated with the second merchant based at least in part on merchant analytic data indicating that the second merchant sells the first item.

At block 408, the process 400 may include determining a first rate at which buyers of the first item from the second merchant return and/or exchange the first item with the second merchant. In other words, the first rate may be a rate at which how many times the item is returned to the second merchant for a refund and/or a new item. For instance, the first item may be defective and/or undesirable. As such, the buyers of the first item may frequently return the first item to the second merchant for a refund. Alternatively, or additionally, the buyers of the first item may exchange the first item for a second item sold by the second merchant.

Alternatively, or additionally, at block 410 the process 400 may include determining a second rate at which a price for the first item has fluctuated as a function of staleness and/or time spent in the second merchant's inventory catalog. In other words, the second rate may be a rate at which the second merchant has increased or decreased the price for the first item based on the first item going in and out of season. For example, the first item may be winter gloves that the second merchant has decreased the price for during a summer season.

Alternatively, or additionally, at block 412 the process 400 may include determining a third rate at which the first item has been re-stocked and/or re-ordered by the second merchant. For instance, the first item may be a popular item that is hard for merchants to keep in stock. In other instances, the first item may be a perishable item, such as fruit. In such a case, the third rate may be a rate at which the first item should be re-ordered to keep fresh stock on hand.

At block 414, the process 400 may include determining whether the first rate, the second rate, and/or the third rate exceed a threshold rate. In examples, the threshold rate may be specific to the first merchant. For instance, the threshold rate may be set by the first merchant according to the first merchant's profit expectation. Alternatively, or additionally, the threshold rate may be specific to the first item. For instance, depending on the type of item, the threshold rate for returns and/or exchanges for a first type of item may be five returns per month, whereas the threshold rate for returns and/or exchanges of a second type of item may be ten returns per year. Accordingly, if the determined first rate for returning and/or exchanging the first item is fifteen times per year, and the threshold rate is ten times per year, then the first rate would exceed the threshold rate.

At block 416, if the first rate, second rate, and/or third rate exceed the threshold rate, the process 400 may include sending a first suggestion to the merchant POS device associated with the first merchant. In examples, the first suggestion may comprise a suggested second item for the first merchant to consider adding to its respective inventory catalog rather than the first item. Alternatively, or additionally, the first suggestion may comprise a warning indicating that the first item may be defective, undesirable, or otherwise problematic and subject to frequent returns and/or exchanges by purchasers.

Alternatively, or additionally, if the first rate, second rate, and/or third rate exceed the threshold rate, at block 418 the process 400 may include sending a second suggestion to the merchant POS device associated with the first merchant. In examples, the second suggestion may comprise a suggested price to charge for the first item. In further examples, the second suggestion may comprise multiple suggested prices to charge for the first item during different seasons.

Alternatively, or additionally, if the first rate, second rate, and/or third rate exceed the threshold rate, at block 420 the process 400 may include sending a third suggestion to the merchant POS device associated with the first merchant. In examples, the third suggestion may comprise a suggested inventory amount to order for the first item based at least in part on a demand for the item. Alternatively, or additionally, the third suggestion may comprise a suggested future calendar date at which the first merchant may need to order a new supply of the first item.

Figure 5:
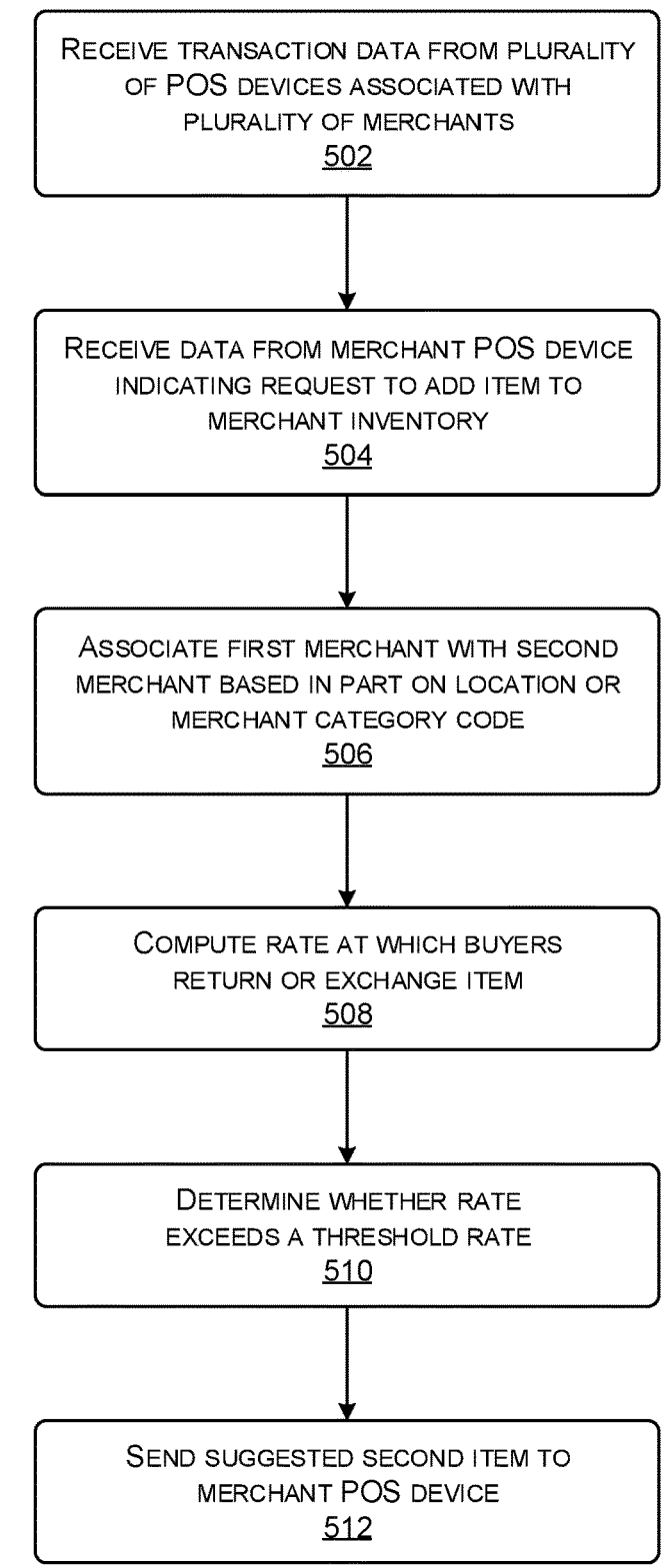
FIGS. 5-7 illustrate logic flow diagrams of example processes for an intelligent inventory system.

FIG. 5 illustrates an example logic flow diagram of an example process 500 for an intelligent inventory system. The order in which the operations or steps are described is not intended to be construed as a limitation, and any number of the described operations may be combined in any order and/or in parallel to implement process 500.

At block 502, the process 500 may include receiving transaction data from a plurality of POS devices associated with a plurality of merchants. In examples, the transaction data may include an amount of times a specific item has been returned and/or exchanged by a customer for one or more merchants of the plurality of merchants. Additionally, or alternatively, the transaction data may indicate a second item sold by a merchant that is commonly purchased by consumers in exchange of or in place of a first item.

At block 504, the process 500 may include receiving data from a merchant POS device associated with a merchant. The data may indicate a request to add an item to an inventory catalog associated with the merchant. In examples, the data may have been sent from the merchant POS device in response to the merchant selecting and/or ordering the item. Alternatively, or additionally, the data may have been sent in response to the merchant POS device detecting that a quantity of the item stored in the merchant's inventory catalog was low.

At block 506, the process 500 may include associating the first merchant with a second merchant. The second merchant may be similarly-situated to the first merchant with respect to a location of the first merchant and/or a merchant category code (MCC) of the first merchant. For instance, the first merchant may be associated with the second merchant based at least in part on geolocation data indicating that the first merchant is located within a threshold distance of the second merchant. Alternatively, or additionally, the first merchant may be associated with the second merchant based at least in part on merchant analytic data indicating that the second merchant sells the first item.

At block 508, the process 500 may include computing a rate at which buyers return and/or exchange the item from the merchant. For instance, the item may be undesirable, defective, and or the like. Accordingly, buyers of the item may frequently return the item to the merchant. In this way, the process may determine whether the item is profitable for the merchant to continue carrying in the merchant's inventory catalog. In examples, determining the rate could be determined for different locations of the merchant. For instance, the merchant may have multiple locations in different geographic regions. Accordingly, the process may determine a rate for each location of the merchant.

At block 510, the process 500 may include determining whether the rate exceeds a threshold rate. This may include determining whether a rate for a specific location of the merchant exceeds a threshold rate for profitability. For instance, the threshold rate may be set by the first merchant according to the first merchant's profit expectation. Alternatively, or additionally, the threshold rate may be specific to the first item. For instance, depending on the type of item, the threshold rate for returns and/or exchanges for a first type of item may be five returns per month, whereas the threshold rate for returns and/or exchanges of a second type of item may be ten returns per year. Accordingly, if the determined first rate for returning and/or exchanging the first item is fifteen times per year, and the threshold rate is ten times per year, then the first rate would exceed the threshold rate.

At block 512, if the rate exceeds the threshold rate, the process 500 may include sending a suggestion to the merchant POS device of the merchant. In examples, the suggestion may include a notification that the item may be defective, undesirable, or otherwise problematic. Alternatively, or additionally, the suggestion may include a suggested alternate item that the merchant should consider ordering rather than the original item.

Figure 6:
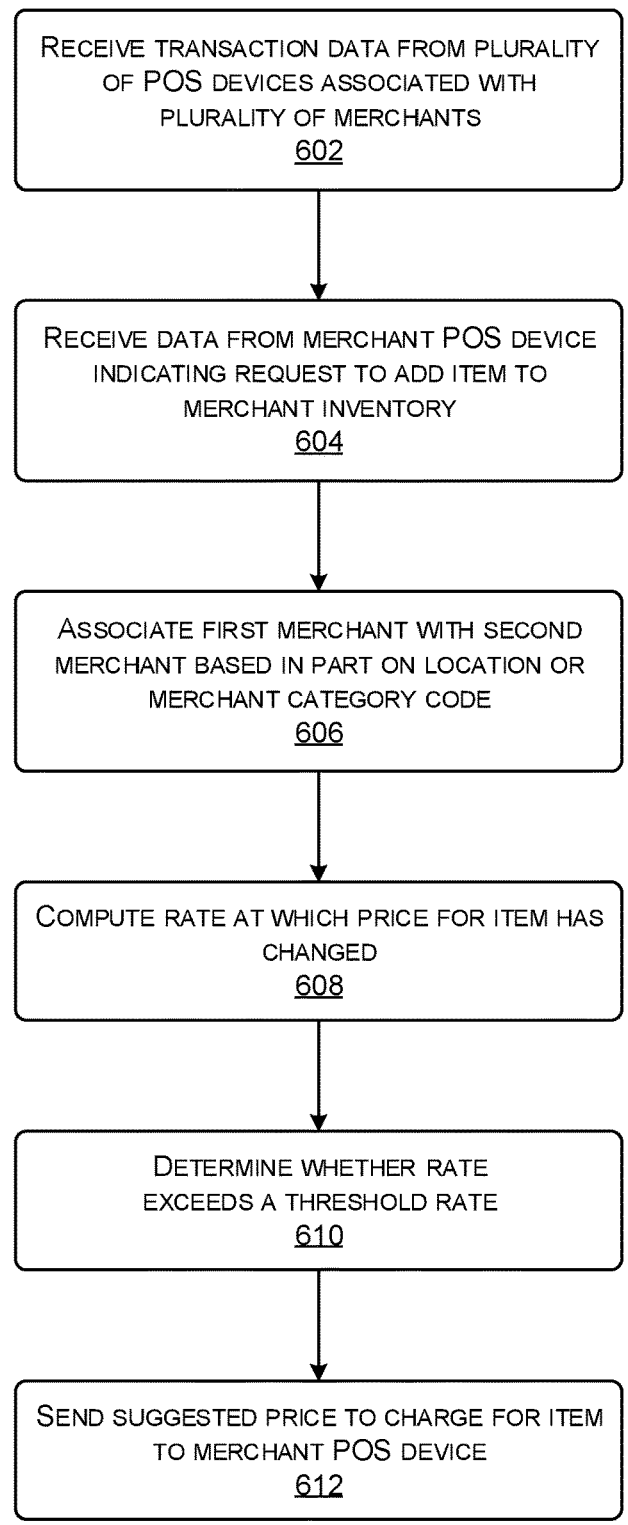

FIG. 6 illustrates an example logic flow diagram of an example process 600 for an intelligent inventory system. The order in which the operations or steps are described is not intended to be construed as a limitation, and any number of the described operations may be combined in any order and/or in parallel to implement process 600.

At block 602, the process 600 may include receiving transaction data from a plurality of POS devices associated with a plurality of merchants. In examples, the transaction data may include a price for which a specific item was sold by a merchant on a particular date. In this way, it may be possible to compute a rate at which the price for the specific item has changed as a function of time spent in inventory.

At block 604, the process 600 may include receiving data from a merchant POS device associated with a merchant. The data may indicate a request to add an item to an inventory catalog associated with the merchant. In examples, the data may have been sent from the merchant POS device in response to the merchant selecting and/or ordering the item. Alternatively, or additionally, the data may have been sent in response to the merchant POS device detecting that a quantity of the item stored in the merchant's inventory catalog was low.

At block 606, the process 600 may include associating the first merchant with a second merchant. The second merchant may be similarly-situated to the first merchant with respect to a location of the first merchant and/or a merchant category code (MCC) of the first merchant. For instance, the first merchant may be associated with the second merchant based at least in part on geolocation data indicating that the first merchant is located within a threshold distance of the second merchant. Alternatively, or additionally, the first merchant may be associated with the second merchant based at least in part on merchant analytic data indicating that the second merchant sells the first item.

At block 608, the process 600 may include computing a rate at which a price for the item has fluctuated as a result of staleness and/or time spent in the inventory catalog of the merchant. For instance, the item may be a seasonal item which is hard to sell in the summer, such as winter gloves. Accordingly, the merchant may routinely lower the price of the winter gloves during the summer. In examples, determining the rate could be determined for different locations of the merchant. For instance, the merchant may have multiple locations in different geographic regions. Accordingly, the process may determine a rate for each location of the merchant.

At block 610, the process 600 may include determining whether the rate exceeds a threshold rate. This may include determining whether a rate for a specific location of the merchant exceeds a threshold rate for profitability. For instance, the threshold rate may be set by the first merchant according to the first merchant's profit expectation. Alternatively, or additionally, the threshold rate may be specific to the first item. For instance, depending on the type of item, the threshold rate for returns and/or exchanges for a first type of item may be five returns per month, whereas the threshold rate for returns and/or exchanges of a second type of item may be ten returns per year. Accordingly, if the determined first rate for returning and/or exchanging the first item is fifteen times per year, and the threshold rate is ten times per year, then the first rate would exceed the threshold rate.

At block 612, if the rate exceeds the threshold rate, the process 600 may include sending a suggestion to the merchant POS device of the merchant. In examples, the suggestion may include a suggested price to charge for the item depending on a current time of year. Alternatively, or additionally, the suggestion may include suggested prices for each of the merchant's locations.

Figure 7:
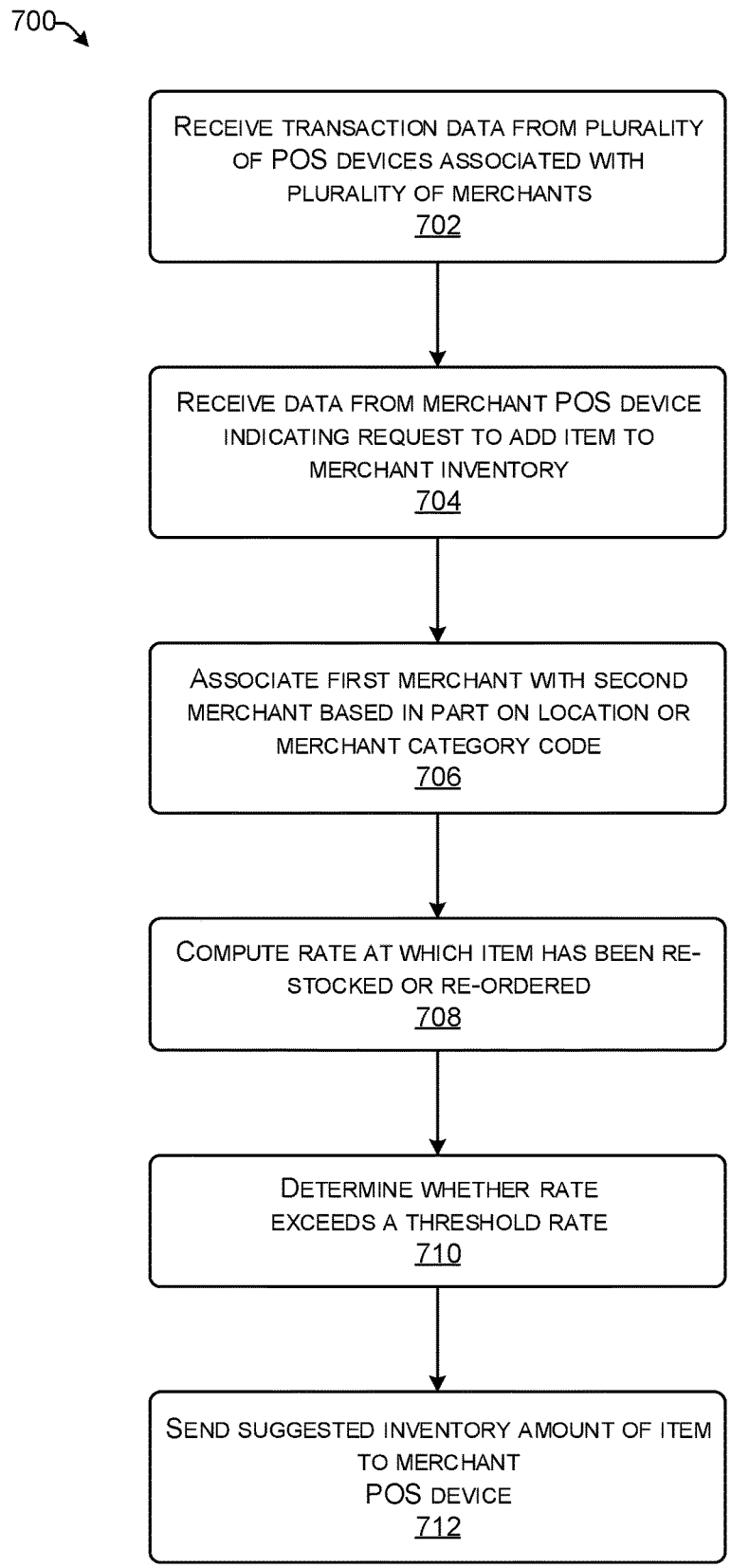

FIG. 7 illustrates an example logic flow diagram of an example process 700 for an intelligent inventory system. The order in which the operations or steps are described is not intended to be construed as a limitation, and any number of the described operations may be combined in any order and/or in parallel to implement process 700.

At block 702, the process 700 may include receiving transaction data from a plurality of POS devices associated with a plurality of merchants. In examples, transaction data may be acquired from any merchant who decides to allow his or her transaction data to be gathered by the payment-processing service. The transaction data may indicate an amount of times that a specific item has been re-stocked and/or re-ordered by a merchant due to a consumer demand associated with the specific item. For instance, the transaction data may indicate that a specific item has been re-ordered by a merchant twelve times per year.

At block 704, the process 700 may include receiving data from a merchant POS device associated with a merchant. The data may indicate a request to add an item to an inventory catalog associated with the merchant. In examples, the data may have been sent from the merchant POS device in response to the merchant selecting and/or ordering the item. Alternatively, or additionally, the data may have been sent in response to the merchant POS device detecting that a quantity of the item stored in the merchant's inventory catalog was low.

At block 706, the process 700 may include associating the first merchant with a second merchant. The second merchant may be similarly-situated to the first merchant with respect to a location of the first merchant and/or a merchant category code (MCC) of the first merchant. For instance, the first merchant may be associated with the second merchant based at least in part on geolocation data indicating that the first merchant is located within a threshold distance of the second merchant. Alternatively, or additionally, the first merchant may be associated with the second merchant based at least in part on merchant analytic data indicating that the second merchant sells the first item.

At block 708, the process 700 may include computing a rate at which the merchant has re-stocked and/or re-ordered the item based at least in part on a demand for the item. In examples, determining the rate could be determined for different locations of the merchant. For instance, the merchant may have multiple locations in different geographic regions. In examples, the item may be more popular at some of the locations of the merchant and less popular at other locations. Accordingly, the process may determine a rate for each location of the merchant.

At block 710, the process 700 may include determining whether the rate exceeds a threshold rate. This may include determining whether a rate for a specific location of the merchant exceeds a threshold rate for profitability. For instance, the threshold rate may be set by the first merchant according to the first merchant's profit expectation. Alternatively, or additionally, the threshold rate may be specific to the first item. For instance, depending on the type of item, the threshold rate for returns and/or exchanges for a first type of item may be five returns per month, whereas the threshold rate for returns and/or exchanges of a second type of item may be ten returns per year. Accordingly, if the determined first rate for returning and/or exchanging the first item is fifteen times per year, and the threshold rate is ten times per year, then the first rate would exceed the threshold rate.

At block 712, if the rate exceeds the threshold rate, the process 700 may include sending a suggestion to the merchant POS device of the merchant. In examples, the suggestion may include a suggested inventory amount of the item for the merchant to order for each of the merchant's locations. Alternatively, or additionally, the suggestion may include a suggested future calendar date when the merchant may need to re-order a supply of the item for the merchant's inventory catalog.

Figure 8:
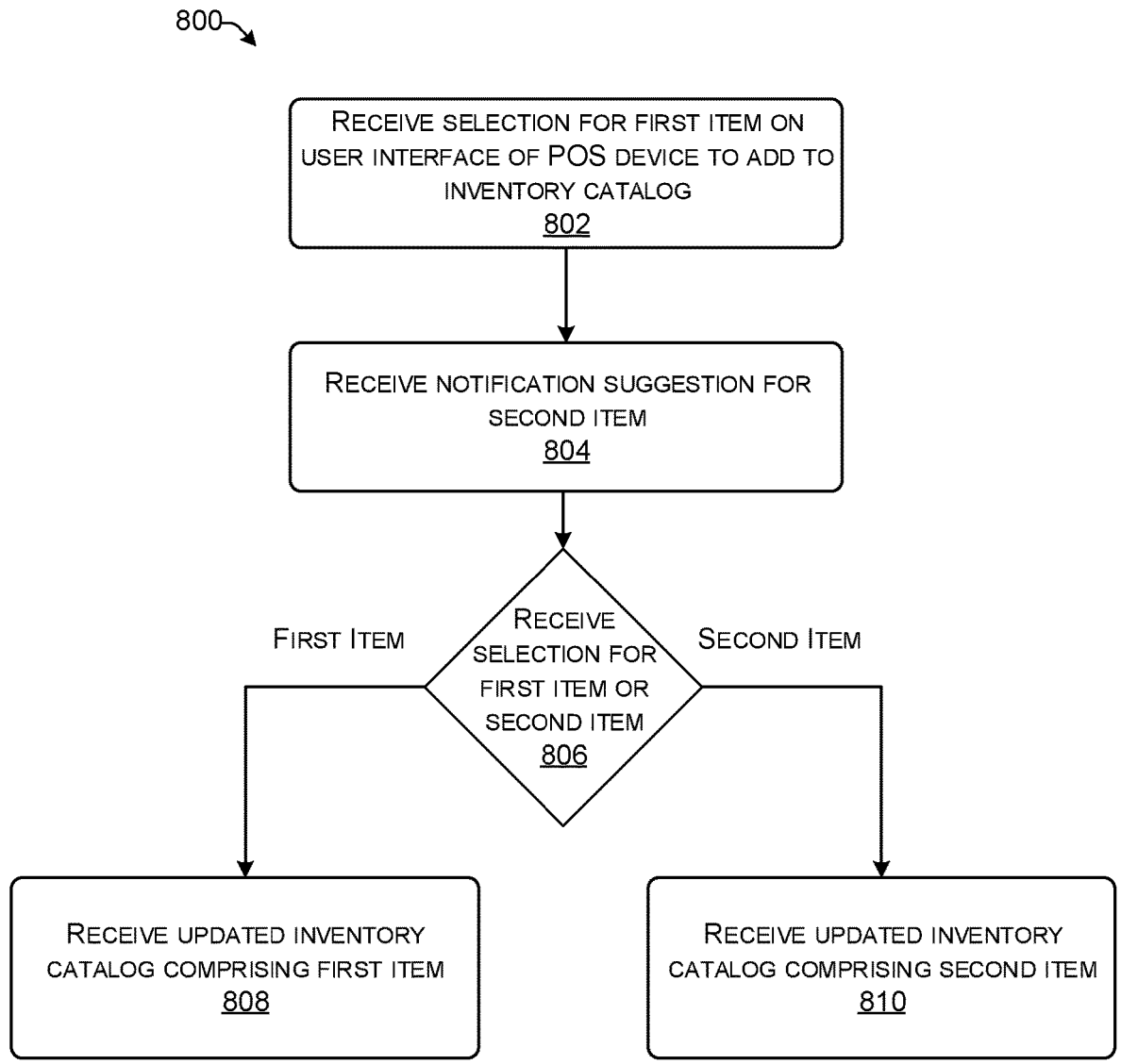
FIG. 8 illustrates a logic flow diagram of an example merchant process for using an intelligent inventory system.

FIG. 8 illustrates a logic flow diagram of an example merchant process for using an intelligent inventory system. The order in which the operations or steps are described is not intended to be construed as a limitation, and any number of the described operations may be combined in any order and/or in parallel to implement process 800.

At block 802, the process 800 may include receiving a selection for a first item to add to an inventory catalog. In examples, the first item may be selected from a list of one or more items displayed on a user interface of a merchant POS device. For instance, a user interface of the POS device may display the list of items for the merchant to add to its inventory catalog based on detecting that the merchant's inventory catalog is low in stock on one or more items. Additionally, or alternatively, the user interface of the POS device may present the list of items in response to an input received from the POS device.

At block 804, the process 800 may include, receiving a notification suggesting a second item to add to the inventory catalog rather than the first item. In examples, the notification suggestion may be received in response to selecting the first item to add to the inventory catalog. For example, the first item may have a high return and/or exchange rate. As such, the notification suggesting a second item may be received if the rate at which the first item is returned and/or exchanged by consumers for similarly-situated merchants exceeds a threshold rate for returns and/or exchanges. Additionally, or alternatively, the notification suggesting the second item to add to the inventory catalog rather than the first item may be received in response to selecting a first item that is associated with a high price fluctuation rate and/or a high re-stocking rate.

At block 806, the process 800 may include receiving a selection for at least one of the first item or the second item to add to the inventory catalog. In examples, the selection of the first item or the second item may be received via an input of the merchant POS device. For instance, the notification suggestion for the second item as discussed above with respect to block 804 may include a selection input that enables a user to select either the first item or the second item. In further examples, the selection of the first item or the second item may be received via a touch input, a voice recognition input, an input device (i.e. a mouse, keyboard, etc.), or another input.

At block 808, in response to receiving a selection the first item, the process 800 may include receiving an updated inventory catalog. In examples, the updated inventory catalog may comprise a quantity of the first item added. For example, if a merchant requested to receive a quantity of ten items for the merchant's inventory catalog, the inventory catalog may be updated to show the additional ten items added to the inventory catalog. Additionally, or alternatively, the updated inventory catalog may comprise another type of inventory quantity for the item. For instance, the updated quantity may comprise a total weight of the item held in stock in the inventory catalog (such as pounds of flour), a total volume of the item (such as gallons of milk), and/or another quantity type.

Alternatively, in response to receiving a selection for the second item, at block 810 the process 800 may include receiving an updated inventory catalog. In examples, the updated inventory catalog may comprise a quantity of the second item added to the inventory catalog. In examples, the updated inventory catalog comprising the second item may be received instantaneously after receiving the selection for the first item or the second item as described above with reference to block 806. Alternatively, or additionally, the updated inventory catalog may be received in response to a physical item being delivered to a merchant for sale.

As described herein, example implementations of receiving the updated inventory catalog as described above with respect to blocks 808 and 810 of the process 800 may be the same. For instance, examples described above with respect to block 808 may be implemented in block 810, and vice versa.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A system comprising:
one or more processors; and
one or more computer-readable media storing computer-executable instructions that, when executed, cause the one or more processors to perform operations comprising:
receiving transaction data from a plurality of point of sale (POS) devices associated with a plurality of merchants;
receiving, from a first POS device associated with a first merchant, a request to add a first item to an inventory catalog associated with the first merchant;
determining, based at least in part on receiving the request, a subset of the plurality of merchants that have a commonality to the first merchant, wherein the commonality is based at least in part on the first merchant having at least one merchant category code in common with the plurality of merchants;
computing, based at least in part on at least a portion of the transaction data associated with the subset of the plurality of merchants, a frequency of exchange of the first item for one of multiple other items;
selecting a second item of the multiple other items based at least in part on a specific exchange frequency associated with the second item; and
based at least in part on the frequency of exchange satisfying a threshold, causing an interface of the first POS device to produce a first suggestion for the second item to be added to the inventory catalog rather than the first item, wherein user input data indicating an interaction by the first merchant with a portion of the interface associated with the first suggestion causes an automated adjustment to the request.

2. The system of claim 1, wherein determining the subset of the plurality of merchants further comprises determining that the first POS device associated with the first merchant is located within a threshold proximity of the subset of the plurality of merchants based at least in part on global positioning system (GPS) coordinates of the first merchant and the plurality of merchants.

3. The system of claim 1, wherein receiving the transaction data is performed by a network-based computing device associated with a transaction-processing service, the transaction-processing service being disposed between a payment-fulfillment service and the plurality of merchant POS devices associated with the plurality of merchants.

4. The system of claim 1, the operations further comprising identifying, based at least in part on the transaction data and one or more inventory catalogs associated with the subset of the plurality of merchants, the second item to be added to the inventory catalog rather than the first item.

5. The system of claim 1, the operations further comprising computing a first rate at which a price for the first item has changed based at least in part on a second rate at which buyers of the first item from the subset of the plurality of merchants have returned the first item, and wherein the first suggestion is based at least in part on the first rate.

6. The system of claim 1, the operations further comprising computing a first rate at which the first item has been at least one of re-stocked or re-ordered based at least in part on a second rate at which the first item has been at least one of re-stocked or re-ordered for a second merchant.

7. A method comprising:
receiving transaction data from a plurality of point of sale (POS) devices associated with a plurality of merchants;
receiving, from a first POS device associated with a first merchant, a request to add a first item to an inventory catalog associated with the first merchant;
determining, based at least in part on receiving the request, a subset of the plurality of merchants that have a commonality to the first merchant, wherein the commonality is based at least in part on the first merchant having at least one merchant category code in common with the plurality of merchants;
computing, based at least in part on a portion of the transaction data associated with the subset of the plurality of merchants, a frequency of exchange of the first item for one of multiple other items;
selecting a second item of the multiple other items based at least in part on a specific exchange frequency associated with the second item; and
based at least in part on the frequency of exchange satisfying a threshold, causing an interface of the first POS device to display a first suggestion for the second item to be added to the inventory catalog rather than the first item, wherein an interaction by the merchant with a portion of the interface corresponding to the first suggestion causes an automated adjustment to the request.

8. The method of claim 7, wherein determining the subset of the plurality of merchants further comprises
determining that the first POS device associated with the first merchant is located within a threshold proximity of the subset of the plurality of merchants based at least in part on global positioning system (GPS) coordinates of the first merchant and the plurality of merchants.

9. The method of claim 7, wherein receiving the transaction data is performed by a network-based computing device associated with a transaction-processing service, the transaction-processing service being disposed between a payment-fulfillment service and the plurality of merchant POS devices associated with the plurality of merchants.

10. The method of claim 7, further comprising identifying, based at least in part on the transaction data and one or more inventory catalogs associated with the subset of the plurality of merchants, the second item to be added to the inventory catalog rather than the first item.

11. The method of claim 7, further comprising computing a rate at which a price for the item has changed for a second merchant, wherein the first suggestion is based at least in part on the rate.

12. The method of claim 7, further comprising computing a first rate at which the first item has been at least one of re-stocked or re-ordered based at least in part on a second rate at which the first item has been at least one of re-stocked or re-ordered for a second merchant.

13. The system of claim 1, the operations further comprising causing the interface to display a selectable option to acquire the second item, the selectable option, when selected, causing the second item to be purchased for the merchant.

14. The system of claim 1, the operations further comprising:
receiving data indicating that the merchant is interacting with a purchase order; and
causing display of the first suggestion based at least in part on receiving the data.

15. The system of claim 1, wherein the frequency of exchange is based at least in part on (i) a popularity of the second item compared to the first item and (ii) the second item being a different version of the first item.

16. The system of claim 1, wherein the first suggestion is further based at least in part on (i) the current season of when the first suggestion is made and (ii) price fluctuations of the first item and the second item.

17. The method of claim 7, wherein the frequency of exchange is based at least in part on (i) a popularity of the second item compared to the first item and (ii) the second item being a different version of the first item.

18. The system of claim 1, the operations further comprising:
- determining that the frequency of exchange of the first item for the one of multiple other items satisfies a threshold frequency; and
- wherein selecting the second item is based at least in part on determining that the frequency of exchange of the first item for the one of multiple other items satisfies the threshold frequency.

* * * * *